United States Patent
Lam et al.

(10) Patent No.: US 7,519,560 B2
(45) Date of Patent: Apr. 14, 2009

(54) SYSTEM AND METHOD FOR ELECTRONIC AUTHORIZATION OF BATCH CHECKS

(75) Inventors: Duc Lam, San Jose, CA (US); Matthew Roland, San Francisco, CA (US); Xuan (Sunny) McRae, Fremont, CA (US)

(73) Assignee: JPMorgan Chase Bank, N.A., New York, NY (US)

( * ) Notice: Subject to any disclaimer, the term of this patent is extended or adjusted under 35 U.S.C. 154(b) by 1056 days.

(21) Appl. No.: 10/155,800

(22) Filed: May 24, 2002

(65) Prior Publication Data

US 2003/0220886 A1 Nov. 27, 2003

(51) Int. Cl.
*G06Q 99/00* (2006.01)
(52) U.S. Cl. .............................. 705/64; 713/176; 380/51
(58) Field of Classification Search .................. 705/64, 705/75, 40, 34, 39; 713/187, 193, 176; 380/51, 380/55
See application file for complete search history.

(56) References Cited

U.S. PATENT DOCUMENTS

| | | | |
|---|---|---|---|
| 3,653,480 | A | 4/1972 | Yamamoto et al. |
| 4,205,780 | A | 6/1980 | Burns |
| 4,264,808 | A | 4/1981 | Owens et al. |
| 4,321,672 | A | 3/1982 | Braun et al. |
| 4,385,285 | A | 5/1983 | Horst et al. ..................... 382/3 |
| 4,396,985 | A | 8/1983 | Ohara |
| 4,495,018 | A | 1/1985 | Vohrer |
| 4,617,457 | A | 10/1986 | Granzow et al. |
| 4,672,377 | A | 6/1987 | Murphy |
| 4,694,397 | A | 9/1987 | Grant et al. |
| 4,700,055 | A | 10/1987 | Kashkashian, Jr. |

(Continued)

FOREIGN PATENT DOCUMENTS

EP 0 665 486 A2 2/1995

(Continued)

OTHER PUBLICATIONS

Henry Urrows and Elizabeth Urrows, Automated imaging in financial services., Sep.-Oct. 1991, Document Image Automation, vol. 11, No. 5, pp. 259(16).*

(Continued)

*Primary Examiner*—James Trammell
*Assistant Examiner*—Behrang Badii
(74) *Attorney, Agent, or Firm*—Lowenstein Sandler PC

(57) ABSTRACT

A method of effecting payment. A system for effecting payment. Instructions to send a set of financial instruments to a set of recipients are received at a first system from an agent. A digital signature of the agent is created using a private key associated with the agent is added to the instructions. The agent is associated with a first entity. The instructions are transmitted to a second system. The second system in the instructions are verified using a public key corresponding to a private key associated with the agent. A set of financial instructions is created electronically and digital signatures created using a second private key are added to the financial instruments. The financial instruments from among the set of financial instruments are sent to respective recipients according to the instructions. According to one embodiment of the invention, the financial instruments are encrypted using public keys of respective recipients. According to another embodiment of the invention, terms are presented to the system administrator indicating that the entity shall be responsible for transactions effected by the agent before authorization is provided to the agent to effect creation of the checks with the digital signatures using the private key of the entity.

18 Claims, 9 Drawing Sheets

U.S. PATENT DOCUMENTS

| | | |
|---|---|---|
| 4,713,761 A | 12/1987 | Sharpe et al. |
| 4,752,877 A | 6/1988 | Roberts et al. |
| 4,797,913 A | 1/1989 | Kaplan |
| 4,799,156 A | 1/1989 | Shavit |
| 4,812,628 A | 3/1989 | Boston |
| 4,823,264 A | 4/1989 | Deming |
| 4,931,793 A | 6/1990 | Fuhrmann et al. |
| 4,948,174 A | 8/1990 | Thomson et al. |
| 4,974,878 A | 12/1990 | Josephson |
| 4,975,841 A | 12/1990 | Kehnemuyi et al. |
| 4,988,849 A | 1/1991 | Sasaki |
| 4,992,646 A | 2/1991 | Collin |
| 4,992,940 A | 2/1991 | Dworkin |
| 5,023,904 A | 6/1991 | Kaplan |
| 5,053,607 A | 10/1991 | Carlson |
| 5,054,096 A | 10/1991 | Beizer |
| 5,080,748 A | 1/1992 | Bonomi |
| 5,111,395 A | 5/1992 | Smith |
| 5,121,945 A | 6/1992 | Thomson et al. ............... 283/58 |
| 5,122,950 A | 6/1992 | Benton et al. |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,225,978 A | 7/1993 | Petersen |
| 5,237,159 A | 8/1993 | Stephens |
| 5,265,007 A | 11/1993 | Barnhard, Jr. et al. |
| 5,283,829 A | 2/1994 | Anderson .................... 380/24 |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Kamata et al. |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,367,581 A | 11/1994 | Abel et al. |
| 5,373,550 A | 12/1994 | Campbell |
| 5,383,113 A | 1/1995 | Kight et al. ................. 364/401 |
| 5,396,417 A | 3/1995 | Burks |
| 5,402,474 A | 3/1995 | Miller |
| 5,412,190 A | 5/1995 | Josephson et al. |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,465,206 A | 11/1995 | Hilt et al. .................... 364/406 |
| 5,477,040 A | 12/1995 | Lalonde |
| 5,479,494 A | 12/1995 | Clitherow |
| 5,483,445 A | 1/1996 | Pickering |
| 5,484,988 A | 1/1996 | Hills |
| 5,487,100 A | 1/1996 | Kane ........................... 379/57 |
| 5,502,576 A | 3/1996 | Ramsay et al. |
| 5,504,677 A | 4/1996 | Pollin ......................... 364/408 |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. ........... 235/379 |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas ................. 395/114 |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,592,377 A | 1/1997 | Lipkin |
| 5,592,378 A | 1/1997 | Cameron |
| 5,599,528 A | 2/1997 | Igaki |
| 5,603,025 A | 2/1997 | Tabb |
| 5,615,109 A | 3/1997 | Eder |
| 5,621,201 A | 4/1997 | Langhans |
| 5,640,577 A | 6/1997 | Scharmer |
| 5,642,419 A | 6/1997 | Rosen |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,955 A | 10/1997 | Doggett et al. ................. 380/24 |
| 5,679,938 A | 10/1997 | Templeton |
| 5,679,940 A | 10/1997 | Templeton |
| 5,687,250 A | 11/1997 | Curley et al. |
| 5,689,593 A | 11/1997 | Pan et al. ....................... 385/11 |
| 5,692,132 A | 11/1997 | Hogan |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,715,298 A | 2/1998 | Rogers |
| 5,715,314 A | 2/1998 | Payne |
| 5,715,399 A | 2/1998 | Bezos |
| 5,717,868 A | 2/1998 | James ........................ 395/325 |
| 5,717,989 A | 2/1998 | Tozzoli et al. |
| 5,724,424 A | 3/1998 | Gifford |
| 5,727,249 A | 3/1998 | Pollin .......................... 705/40 |
| 5,748,780 A | 5/1998 | Stolfo |
| 5,751,842 A | 5/1998 | Riach et al. |
| 5,757,917 A | 5/1998 | Rose et al. |
| 5,770,843 A | 6/1998 | Rose et al. |
| 5,774,553 A | 6/1998 | Rosen |
| 5,783,808 A | 7/1998 | Josephson |
| 5,784,696 A | 7/1998 | Melnikoff |
| 5,793,861 A | 8/1998 | Haigh |
| 5,794,221 A | 8/1998 | Egendorf |
| 5,802,498 A | 9/1998 | Comesanas |
| 5,802,499 A | 9/1998 | Sampson et al. |
| 5,819,238 A | 10/1998 | Fernholz |
| 5,826,241 A | 10/1998 | Stein |
| 5,826,245 A | 10/1998 | Sandberg-Diment |
| 5,832,447 A | 11/1998 | Rieker |
| 5,832,460 A | 11/1998 | Bednar |
| 5,832,463 A | 11/1998 | Funk |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,848,400 A | 12/1998 | Chang ......................... 705/35 |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Bellinger et al. |
| 5,873,072 A | 2/1999 | Kight |
| 5,884,288 A | 3/1999 | Chang et al. ................. 705/40 |
| 5,884,290 A | 3/1999 | Smorodinsky et al. |
| 5,893,080 A | 4/1999 | McGurl et al. ............... 705/40 |
| 5,897,625 A | 4/1999 | Gustin |
| 5,898,157 A | 4/1999 | Mangili et al. |
| 5,903,881 A | 5/1999 | Schrader |
| 5,910,896 A | 6/1999 | Hahn-Carlson |
| 5,910,988 A | 6/1999 | Ballard |

| | | | |
|---|---|---|---|
| 5,917,965 A | 6/1999 | Cahill et al. | |
| 5,920,847 A | 7/1999 | Kolling et al. | |
| 5,930,778 A | 7/1999 | Geer | |
| 5,940,811 A | 8/1999 | Norris | |
| 5,940,844 A | 8/1999 | Cahill et al. | |
| 5,943,656 A | 8/1999 | Crooks | |
| 5,945,653 A | 8/1999 | Walker et al. | |
| 5,956,700 A | 9/1999 | Landry | |
| 5,963,659 A | 10/1999 | Cahill et al. | |
| 5,963,925 A | 10/1999 | Kolling et al. | |
| 5,966,698 A | 10/1999 | Pollin | |
| 5,978,780 A | 11/1999 | Watson | |
| 5,987,435 A | 11/1999 | Weiss et al. | |
| 5,987,436 A | 11/1999 | Halbrook | |
| 5,987,439 A | 11/1999 | Gustin et al. | |
| 5,991,750 A | 11/1999 | Watson | |
| 6,000,832 A | 12/1999 | Franklin et al. | |
| 6,003,762 A | 12/1999 | Hayashida | |
| 6,006,208 A | 12/1999 | Forst et al. | |
| 6,009,442 A | 12/1999 | Chen et al. | |
| 6,014,636 A | 1/2000 | Reeder | |
| 6,016,482 A | 1/2000 | Molinari et al. | |
| 6,016,484 A | 1/2000 | Williams et al. | |
| 6,021,202 A | 2/2000 | Anderson et al. | 380/25 |
| 6,026,388 A | 2/2000 | Liddy et al. | |
| 6,029,139 A | 2/2000 | Cunningham et al. | |
| 6,032,133 A | 2/2000 | Hilt et al. | |
| 6,032,137 A | 2/2000 | Hallard | |
| 6,035,281 A | 3/2000 | Crosskey et al. | |
| 6,035,285 A | 3/2000 | Schlect et al. | |
| 6,035,287 A | 3/2000 | Stallaert et al. | |
| 6,038,553 A | 3/2000 | Hyde, Jr. | |
| 6,041,312 A | 3/2000 | Bickerton et al. | |
| 6,041,315 A | 3/2000 | Pollin | |
| 6,044,362 A | 3/2000 | Neely | |
| 6,052,674 A | 4/2000 | Zervides et al. | |
| 6,058,380 A | 5/2000 | Anderson et al. | |
| 6,058,381 A | 5/2000 | Nelson | |
| 6,061,665 A | 5/2000 | Bahreman | |
| 6,064,764 A | 5/2000 | Bhaskaran et al. | |
| 6,065,675 A | 5/2000 | Teicher | |
| 6,067,524 A | 5/2000 | Byerly et al. | |
| 6,070,150 A | 5/2000 | Remington et al. | |
| 6,070,798 A | 6/2000 | Nethery | |
| 6,073,104 A | 6/2000 | Field | |
| 6,073,113 A | 6/2000 | Guinan | |
| 6,076,072 A | 6/2000 | Libman | |
| 6,078,907 A | 6/2000 | Lamm | |
| 6,081,790 A | 6/2000 | Rosen | |
| 6,085,168 A | 7/2000 | Mori et al. | |
| 6,088,683 A | 7/2000 | Jalili | |
| 6,088,685 A | 7/2000 | Kiron et al. | |
| 6,088,686 A | 7/2000 | Walker et al. | |
| 6,092,056 A | 7/2000 | Tull, Jr. et al. | |
| 6,098,053 A | 8/2000 | Slater | |
| 6,098,070 A | 8/2000 | Maxwell | |
| 6,105,011 A | 8/2000 | Morrison, Jr. | |
| 6,108,639 A | 8/2000 | Walker et al. | |
| 6,110,044 A | 8/2000 | Stern | |
| 6,111,858 A | 8/2000 | Greaves et al. | |
| 6,115,690 A | 9/2000 | Wong | |
| 6,119,106 A | 9/2000 | Mersky et al. | |
| 6,119,107 A | 9/2000 | Polk | |
| 6,125,354 A | 9/2000 | MacFarlane et al. | |
| 6,128,602 A | 10/2000 | Northington et al. | |
| 6,128,603 A | 10/2000 | Dent et al. | |
| 6,129,273 A | 10/2000 | Shah | |
| 6,138,118 A | 10/2000 | Koppstein et al. | |
| 6,144,946 A | 11/2000 | Iwamura | |
| 6,148,293 A | 11/2000 | King | |
| 6,149,056 A | 11/2000 | Stinson et al. | |
| 6,173,272 B1 | 1/2001 | Thomas et al. | |
| 6,181,837 B1 | 1/2001 | Cahill et al. | |
| 6,185,544 B1 | 2/2001 | Sakamoto et al. | |
| 6,202,054 B1 | 3/2001 | Lawlor et al. | |
| 6,205,433 B1 | 3/2001 | Boesch et al. | |
| 6,223,168 B1 | 4/2001 | McGurl et al. | 705/40 |
| 6,227,447 B1 | 5/2001 | Campisano | |
| 6,233,565 B1 | 5/2001 | Lewis et al. | |
| 6,233,566 B1 | 5/2001 | Levine et al. | |
| 6,236,972 B1 | 5/2001 | Shkedy | |
| 6,240,444 B1 | 5/2001 | Fin et al. | |
| 6,278,981 B1 | 8/2001 | Dembo et al. | |
| 6,289,322 B1 * | 9/2001 | Kitchen et al. | 705/40 |
| 6,292,789 B1 | 9/2001 | Schutzer | |
| 6,298,335 B1 | 10/2001 | Bernstein | |
| 6,301,379 B1 | 10/2001 | Thompson et al. | |
| 6,304,858 B1 | 10/2001 | Mosler et al. | |
| 6,321,212 B1 | 11/2001 | Lange | |
| 6,324,524 B1 | 11/2001 | Lent et al. | |
| 6,338,047 B1 | 1/2002 | Wallman | |
| 6,338,049 B1 | 1/2002 | Walker et al. | |
| 6,343,279 B1 | 1/2002 | Bissonette et al. | |
| 6,347,307 B1 | 2/2002 | Sandhu et al. | |
| 6,363,364 B1 | 3/2002 | Nel | |
| 6,363,365 B1 | 3/2002 | Kou | |
| 6,374,235 B1 | 4/2002 | Chen et al. | |
| 6,393,409 B2 | 5/2002 | Young et al. | |
| 6,405,173 B1 | 6/2002 | Honarvar et al. | |
| 6,411,942 B1 * | 6/2002 | Fujimoto | 705/64 |
| 6,415,259 B1 | 7/2002 | Wolfinger et al. | |
| 6,418,419 B1 | 7/2002 | Nieboer et al. | |
| 6,418,420 B1 | 7/2002 | DiGiorgio et al. | |
| 6,418,430 B1 | 7/2002 | DeFazio et al. | |
| 6,446,072 B1 | 9/2002 | Schulze et al. | |
| 6,490,568 B1 | 12/2002 | OMara et al. | |
| 6,493,685 B1 | 12/2002 | Ensel et al. | |
| 6,535,896 B2 | 3/2003 | Britton et al. | |
| 6,574,350 B1 | 6/2003 | Rhoads et al. | |
| 6,574,377 B1 | 6/2003 | Cahill et al. | |
| 6,578,000 B1 | 6/2003 | Dodrill et al. | |
| 6,578,015 B1 | 6/2003 | Haseltine et al. | |
| 6,609,113 B1 | 8/2003 | O'Leary et al. | |
| 6,609,125 B1 | 8/2003 | Layne et al. | |
| 6,629,081 B1 | 9/2003 | Cornelius et al. | |
| 6,636,615 B1 | 10/2003 | Rhoads et al. | |
| 6,704,714 B1 | 3/2004 | O'Leary et al. | |
| 6,721,715 B2 | 4/2004 | Nemzow | |
| 6,825,940 B1 | 11/2004 | Wu et al. | |
| 6,954,896 B1 | 10/2005 | Dodrill et al. | |
| 6,970,259 B1 | 11/2005 | Lunt et al. | |
| 6,970,855 B2 | 11/2005 | Das et al. | |
| 7,062,456 B1 | 6/2006 | Riehl et al. | |
| 7,104,443 B1 | 9/2006 | Paul et al. | |
| 7,177,836 B1 | 2/2007 | German et al. | |
| 2001/0011222 A1 | 8/2001 | Mclauchlin et al. | |
| 2001/0018666 A1 | 8/2001 | Sugiyama et al. | |
| 2001/0018739 A1 | 8/2001 | Anderson et al. | |
| 2001/0032139 A1 | 10/2001 | Debonnett, Jr. | |
| 2001/0037309 A1 | 11/2001 | Vrain | |
| 2001/0047334 A1 | 11/2001 | Nappe et al. | |
| 2001/0047489 A1 | 11/2001 | Ito et al. | |
| 2002/0012445 A1 | 1/2002 | Perry | |
| 2002/0013728 A1 | 1/2002 | Wilkman | |
| 2002/0023055 A1 | 2/2002 | Antognini et al. | |
| 2002/0026394 A1 | 2/2002 | Savage et al. | |
| 2002/0038363 A1 | 3/2002 | MacLean | |
| 2002/0052842 A1 | 5/2002 | Schuba et al. | |
| 2002/0055907 A1 | 5/2002 | Pater et al. | |
| 2002/0069134 A1 | 6/2002 | Solomon | |
| 2002/0072976 A1 | 6/2002 | Virtanen et al. | |
| 2002/0077978 A1 | 6/2002 | O'Leary et al. | |
| 2002/0082985 A1 | 6/2002 | MacKay | |
| 2002/0087415 A1 | 7/2002 | Allen et al. | |
| 2002/0087468 A1 | 7/2002 | Ganesan et al. | |
| 2002/0087469 A1 | 7/2002 | Ganesan et al. | |

| | | | |
|---|---|---|---|
| 2002/0091635 | A1 | 7/2002 | Dilip et al. |
| 2002/0107770 | A1 | 8/2002 | Meyer et al. |
| 2002/0107788 | A1 | 8/2002 | Cunningham |
| 2002/0111837 | A1 | 8/2002 | Aupperle |
| 2002/0120537 | A1 | 8/2002 | Morea et al. |
| 2002/0138398 | A1 | 9/2002 | Kalin et al. |
| 2002/0152133 | A1 | 10/2002 | King et al. |
| 2002/0170966 | A1 | 11/2002 | Hannigan et al. |
| 2002/0178071 | A1 | 11/2002 | Walker et al. |
| 2002/0184151 | A1 | 12/2002 | Maloney |
| 2002/0194096 | A1 | 12/2002 | Falcone et al. |
| 2002/0198817 | A1 | 12/2002 | Dhir |
| 2002/0199182 | A1 | 12/2002 | Whitehead |
| 2003/0018557 | A1 | 1/2003 | Gilbert et al. |
| 2003/0037002 | A1 | 2/2003 | Higgins et al. |
| 2003/0046218 | A1 | 3/2003 | Albanese et al. |
| 2003/0070080 | A1* | 4/2003 | Rosen ........................ 713/187 |
| 2003/0097335 | A1 | 5/2003 | Moskowitz et al. |
| 2003/0105641 | A1 | 6/2003 | Lewis |
| 2003/0110442 | A1 | 6/2003 | Battle |
| 2003/0120686 | A1 | 6/2003 | Kim et al. |
| 2003/0130945 | A1 | 7/2003 | Force et al. |
| 2003/0130952 | A1 | 7/2003 | Bell et al. |
| 2003/0187789 | A1 | 10/2003 | Karas et al. |
| 2003/0191710 | A1 | 10/2003 | Green et al. |
| 2003/0208421 | A1 | 11/2003 | Vicknair et al. |
| 2003/0208441 | A1 | 11/2003 | Poplawski et al. |
| 2003/0225663 | A1 | 12/2003 | Horan et al. |
| 2003/0233305 | A1 | 12/2003 | Solomon |
| 2003/0237046 | A1 | 12/2003 | Parker et al. |
| 2004/0064409 | A1 | 4/2004 | Kight et al. |
| 2004/0078328 | A1 | 4/2004 | Talbert et al. |
| 2004/0133516 | A1 | 7/2004 | Buchanan et al. |
| 2004/0181493 | A1* | 9/2004 | Cross et al. ................... 705/75 |
| 2004/0201735 | A1 | 10/2004 | Baron |
| 2004/0228514 | A1 | 11/2004 | Houle et al. |
| 2005/0033690 | A1 | 2/2005 | Antognini et al. |
| 2005/0097050 | A1 | 5/2005 | Orcutt |
| 2005/0144059 | A1 | 6/2005 | Schuessler |
| 2005/0177480 | A1 | 8/2005 | Huang |
| 2006/0106650 | A1 | 5/2006 | Bush |

FOREIGN PATENT DOCUMENTS

| | | |
|---|---|---|
| EP | 1014318 | 6/2000 |
| WO | 421808 | 4/1991 |
| WO | 91/16691 | 10/1991 |
| WO | 93/08545 | 4/1993 |
| WO | 94/28497 | 12/1994 |
| WO | 96/08783 | 3/1996 |
| WO | 96/12242 A1 | 4/1996 |
| WO | 97/14108 | 4/1997 |
| WO | 97/45796 | 12/1997 |
| WO | 97/45814 | 12/1997 |
| WO | 98/09260 | 3/1998 |
| WO | 99/10823 | 3/1999 |
| WO | WO 00/18060 | 3/2000 |
| WO | 00/39979 | 7/2000 |
| WO | 01/75730 A2 | 10/2001 |
| WO | 02/063432 A2 | 8/2002 |
| WO | 2004/079603 | 9/2004 |

OTHER PUBLICATIONS

"E-Billing: New Age Electronic Data", Jul. 5, 2000, Bank Technology News.

K. Hill, "The Direction of the Industry Part II: Assessing the leaders in the industry," ebillmag.com, editorial, Jul. 2001.

K. Hill, "The Direction of the Industry Part I: What you need to lead," ebillmag.com, editorial, Jun. 2001.

J. Patel, "Business-to-business E-Billing Heats up", InformationWeek, 246, Oct. 23, 2000.

J. Patel et al., "E-Billing Moves Into B2B," Imaging & document solutions, v10, n1, p. 44(5), Jan. 2001.

B. Malone, "Internet Billing: Building a Secure Global Market," Electronic Commerce World, v11, n1, p. 46, Jan. 2001.

S. Leibs, "Internet Billing Gets Its Due," CFO, v17, n2, p. 30, Feb. 2001.

G. Platt, "Online Billing & Payments: Technology Providers Multiply," Global Finance, v15, n4, p. 40, Apr. 2001.

"Business-to-Business EIPP: Presentment Models and Payment Options Part One: Presentment Models," Jan. 2001, Council for Electronic Billing and Payment.

"Business-to-Business EIPP: Presentment Models and Payment Options Part Two: Payment Options," Jan. 2001, Council for Electronic Billing and Payment.

J. Akister et al., "Electronic Cheque Processing System," U.S. Appl. No. 09/633,861, filed Aug. 7, 2000.

P. Pavlik, "Digital Signature System," U.S. Appl. No. 09/577, 660, filed May 25, 2000.

Anonymous; Visa & Carnegie Mellon Plan Online Payment Scheme, Newsbyte News Network, Feb. 15, 1995.

Goode; On Profit, Loss and the Mysteries of the Mind, The New York Times, Nov. 5, 2002.

Fidelity Helps Fund Sellers Trim the Taxes They'll Owe, The Wall Street Journal, Nov. 7, 2002.

Zuckerman; The Hedge-Fund Craze, The Wall Street Journal, Jun. 12, 2002.

Harsh Truth: Your Investments Likely Won't Make Any Money.

McDonald; The Stars in the Sky Flicker, and Fund Stars Do the Same, The Wall Street Journal, Jan. 15, 2003.

Maher and Troutman; Provider's Prescription for Painless Migration to Receipt of Electronic Healthcare Payments and Remittance Advices, PNC Bank, Dec. 2001.

Maher and Troutman; Payor's Prescription for Painless Migration to Electronics Healthcare Payments and Remittance Advices, PNC Bank, Dec. 2001.

CES/Nabanco Introduces Stores Value Card Technology Blockbuster Video is First Merchant Partner, Business Wire, Inc., Jan. 15, 1996.

First Data Markets Stored-Value Cards, Cards International, Jan. 30, 1996, p. 5.

Norris; First Data Unit Develops Blockbuster Cash Card, Omaha World Hearld Sunrise Edition, Business Section, Jan. 19, 1996, p. 16.

Blockbuster Running Test of a Stored Value Card, The American Banker, Sep. 1, 1995.

Financial News; Wells Fargo Rolls Out Nationwide Lockbox Check Conversion, PR Newswire Association, Apr. 22, 2003.

Malhotra; Clearing House Enumerates E-Payments Ills, The American Banker, vol. 167, No. 154, Aug. 23, 2002.

Card Flash Daily Payment Card News, www.cardweb.com, Printed Sep. 23, 2004.

Mokia Announces the World's First NFC Enabled Mobile Product for Contactless Payment and Ticketing, PRNewswire, Feb. 9, 2005.

Annual Report Pursuant to Sectin 13 or 15(D) of the Securities Exchange Act of 1934, Form 10-K, Intelidata Technologies Corporation, Fiscal Year Ended Dec. 31, 2001.

Technology, in Brief Wachovia-Intelidata Deal, May 7, 2002.

French; Tech Stocks: Market Movers, Investors Worry Checkfree Being Chased From its Own Game, http://www.thestreet.com, Jun. 20, 2002.

Money, Initial Launch to 200 Credit Unions, USS Today.com, Jun. 27, 2002.

Bills; Chase Pact Done, What's Next for Web Vendors?, The American Banker, Technology Section, Jun. 3, 2002, p. 23.

Anonymous; Chase Manhattan Introduces New Fedi Payables Product, Proquest Document ID: 7806951, ISSN/ISBN: 02686635, May 1995.

Marjanovic; Corporate Services: Chase Gears Up Global Payments System Series: 16, The American Banker, vol. 160, Issue 174, Sep. 11, 1995, p. 41.

Anonymous; Operating in a Multi-Currency Environment, Proquest Document ID 9215937, ISSN/ISBN 09589309, Oct. 1995.

Reinbach; Chase Steps Up Treasury System, Proquest Document ID 8723558, ISSN/ISBN: 10459472, Nov. 1995.

Anonymous; Chasing the Global Trend, Cash Management News, Proquest Document ID 9319923, ISSN/ISBN: 02686635, Dec. 1995.

Gluck; Creating a Global Cash-Management Game Plan, Bank Systems & Technology, Feb. 1997, p. 28.

Anonymous; Systems Spell Change for Foreign Exchange, Global Investor, Proquest Document ID 1056152B, ISSN/ISBN: 09513604, Nov. 1996.

Decovny; Net Scope, Banking Technology, May 1997.

Press Release, Mar. 5, 2004, Payment Data Systems Files Patent on Debit Card Payment Solution, American City Business Journals, Inc., Mar. 5, 2004.

Carreker; Electronics Check Presentment: Capturing New Technology, http://proquest.umi.com, Banking Management, Rolling Meadows: vol. 71, Issue 2, Mar./Apr. 1995, p. 32, 5 pages.

Lamond, Keith; Credit Card Transactions Real World and Online, http://www.virtualschool.edu/mon/electronicproperty/klamond/credit_card.htm, pp. 1-17, Printed Jul. 8, 2005.

Du Pont's Electronic Payments, Corporate EFT Report, V9, N1, Dialog File 636, Accession No. 01066902, Jan. 11, 1989.

Dialog File 20, #10279554; Offer: Book Yourself Free Cassettes; Mar. 25, 2000; Birmingham Post, p. 16.

Terrie Miller and Henry Yan; When Custody Governs, Benefits Canada, Toronto, Feb. 1998, vol. 22, Issue 2, p. 33, 5 pages.

Armstrong, Douglas; Norwest Eases Difficulty of Interstate Banking Bank's Customers May Use the Same Account Number at Any Branch.

Maturi, Richard; Personal Finance; When You Need to Send Cash in a Flash.

* cited by examiner

|  | 607 | 608 | 609 | 610 |  |
|---|---|---|---|---|---|
| 602 | Users | Account | Suppliers | Control |  |

Users | New User | Roles | New Role | Groups | New Groups
611 — 612 — 613 — 614

Change Role Limits or Permissions

Update the following information to change a Role definition.                *indicate

Name & Signing Limits for this Role:

603

*Role Name: [Signing Officer] 615    *Role Description: [Signing permission]
616

Administrator Type: ☐ User Management Authority  617
☐ Account Management Authority  618

Daily Signing Limit: [100000]  619    No Daily Signing Limit: ☐  620

Check Signing Limit: [10000]  621    Check CoSigning Limit: [30000]  622

Permissions for this Role:

Check the appropriate boxes to grant permission(s) for this Role

| Permission |
|---|
| ☑ View payment — 623 |
| ☐ Audit/approve release of payment — 624 |
| ☑ Sign payment — 625 |
| ☑ Import/Sign Payment Instruction File (PIF) — 626 |
| ☑ Void payment — 627 |
| ☑ Hold Payment — 628 |
| ☑ Stop payment — 629 |
| ☑ Create Manual PIF — 630 |
| ☐ Rubberstamp PIF's — 631 |

604

Bank Account Authorization for this Role

Check the box to select the bank account(s) that this Role has authorization to use.

605

| Permission 639 | Account Name 632 | Account Number 633 | Digital Signature 634 | Description 635 |
|---|---|---|---|---|
| ☐ — 636 | Marketing | 02664 | 8888721 | Checking |
| ☐ — 637 | Procurement | 03881 | 2569347 | Corporate |
| ☐ — 638 | Administration | 12520 | 7734123 | Line of Credit |

SYSTEM AND METHOD FOR ELECTRONIC AUTHORIZATION OF BATCH CHECKS

REFERENCE TO RELATED APPLICATIONS

This application is related to the following United States patent applications filed on even date herewith:

Method and System for Collaborative Vendor Reconciliation, application Ser. No. 10/155,797, invented by Duc Lam, Georg Muller, Chandra (CP) Agrawal, Baby Lingampalli, Pavel Lopin and Xuan (Sunny) McRae;

System and Method for Varying Electronic Settlements between Buyers and Suppliers with Dynamic Discount Terms, application Ser. No. 10/155,806, invented by Don Holm, Duc Lam and Xuan (Sunny) McRae;

System and Method for Electronic Payer (Buyer) Defined Invoice Exchange, application Ser. No. 10/155,840, invented by Duc Lam, Ramnath Shanbhogue, Immanuel Kan, Bob Moore and Xuan (Sunny) McRae;

Method and System for Invoice Routing and Approval in Electronic Payment System, application Ser. No. 10/155,853, invented by Bob Moore and Xuan (Sunny) McRae; and Method and System for Buyer-Centric Dispute Resolution in Electronic Payment System, application Ser. No. 10/155,866, invented by Duc Lam, Celeste Wyman and Xuan (Sunny) McRae.

All of the foregoing applications are incorporated herein by reference in their entirety.

BACKGROUND OF THE INVENTION

1. Field of the Invention

This invention relates to the field of software and computer network systems. In particular, the invention relates to electronic systems associated with financial transactions.

2. Description of the Related Art

In traditional paper payment systems, an organization or an individual initiates payment by sending a physical check to the party to whom a debt is owed. The check may be sent in response to an invoice from the party to whom the debt is owed. A newer approach is electronic payment. For example, in the consumer context, individuals may be able to make payment by way of electronic banking. Payment instructions are sent electronically from the individual's computer system to the individual's bank. Payment is then effected by the bank.

Numerous systems now exist relating to accounting and bill payment. For example, computer software is used to track invoices and print payment checks. Payments may be made by wire transfer, with instructions requesting funds of the payer in one financial institution to be transferred to an account of the party to whom payment is to be effected.

Enterprise resource planning (ERP) systems are used for managing the purchases of goods and services. Such systems may have databases of complex and extensive sets of information, such as addresses of various suppliers and similar information related to purchasing. Sellers also use electronic accounting and record keeping systems which may assist in the receipt and tracking receipt of payment for goods and services. Prior systems require considerable amounts of effort to update and maintain, and may lack compatibility with the systems used by parties with whom an organization wishes to engage in transactions. There is thus a need for improved systems to facilitate transactions between buyers and sellers.

SUMMARY

An embodiment of the invention is directed to a method of effecting payment. Instructions to send a set of financial instruments to a set of recipients are received at a first system from an agent. A digital signature of the agent created using a private key associated with the agent is added to the instructions. The agent is associated with a first entity. The instructions are transmitted to a second system. In the second system the instructions are verified using a public key corresponding to a private key associated with the agent. A set of financial instruments is created electronically and digital signatures created using a second private key are added to the financial instruments. The financial instruments from among the set of financial instruments are sent to respective recipients according to the instructions. In one implementation, the second key comprises a private key assigned to the first entity for which the recipients have access to a corresponding public key. In another implementation, the second private key comprises a private key assigned to the system for which recipients have access to a corresponding public key.

According to one embodiment of the invention, the financial instruments are encrypted using public keys of respective recipients. Alternately, respective financial instruments are encrypted with a dynamically generated session key. The dynamically generated session key is encrypted using the public key of the respective recipient and attached to the encrypted instrument. According to another embodiment of the invention, terms are presented to the system administrator indicating that the entity shall be responsible for transactions effected by the agent before authorization is provided to the agent to effect creation of the checks with the digital signatures using the private key of the entity. Alternatively, terms are presented to the system administrator indicating that the entity shall be responsible for transactions effected by the second system before authorization is provided to the second system to effect creation of the checks with digital signatures using the private key of the entity.

According to another embodiment of the invention, instructions are received at the second system from other agents associated with the first entity. The other agents have other private keys and sets of financial instruments are created electronically with digital signatures created using a private key other than the private keys of the agents. Such other private key may comprise a private key assigned to the entity, a private key assigned to the system or other private key in different embodiments of the invention. The financial instruments from among the set of financial instruments are sent to respective recipients according to the instructions.

Another embodiment of the invention is directed to a payment system. The payment system includes a first system associated with a first entity. The first system includes a resource received from an agent instructions to send a set of financial instruments to a set of recipients. The first system also includes a resource to hold a private key associated with an agent, and a resource to add a digital signature of the agent to the instructions using the private key associate with the agent.

The payment system, according to embodiment of the invention, also includes a second system operative to communicate with the first system. The second system includes a resource to verify the instructions using a public key corresponding to the private key associated with the agent. The second system includes a resource to create the set of financial instruments electronically including digital signatures created using a second private key. The second private key may comprise a private key assigned to the first entity for which recipients have access to a corresponding public key or, alternatively, a private key assigned to the system for which the recipients have access to a corresponding public key. The second system additionally includes a resource to forward financial instruments from among the set of financial instruments to respective recipients according to the instructions.

Another embodiment of the invention is directed to a method of effecting payment, including receiving from an agent at a first system instructions to send a set of checks to a set of recipients. A digital signature of the agent created using a private key associated with the agent is added to the instructions. The agent is associated with the first entity. The instructions are transmitted to a second system.

The instructions are verified at the second system using a public key corresponding to the private key associated with the agent. It is determined whether the agent has authority to send a set of checks with a second digital signature. The second digital signature comprises a digital signature of the entity or a digital signature of the second system according to various embodiments of the invention. It is determined whether checks among the set of checks are below a particular threshold. The set of checks is created electronically. Additional signatures from another agent or agents for checks among the set are obtained in response to attributes of the checks. The system administrator may specify the attributes of checks requiring additional signatures according to various implementations. Digital signatures created using a private key of the entity are added to the checks and checks from among the set of checks are sent to the respective recipients according to the instructions.

BRIEF DESCRIPTION OF THE DRAWINGS

FIG. 6(a) is a user interface of role permission set-up according to an embodiment of the invention.

DETAILED DESCRIPTION

An embodiment of the invention is directed to a system that allows for authorization of batches of checks. The batches of checks, according to the embodiment of the invention, have a digital signature of the organization from which they are sent, digital signature of the system or other digital signature that can be identified by the respective recipients. The system accepts instructions from an individual agent, and based on these instructions, creates the batch of checks signed with the organization's digital signature, the signature of the system or other digital signature that can be identified by the respective recipients. The digital signature of the organization, digital signature of the system or other digital signature is created on a separate system not directly accessible by the agent. A system more directly accessible by the agent receives instructions from the agent and is caused to sign the instructions with a digital signature of the agent. In response to the instructions from the system accessible to the agent, the system not directly accessible by the agent creates and signs the batch of electronic checks with the digital signature of the organization. An advantage of this approach is that an agent is able to have a batch of checks signed even though the agent does not have direct access to the process of creating the digital signature on the checks. Security can be obtained through applying the agent's digital signature to the instructions for creating the batch of checks.

Figure 1:
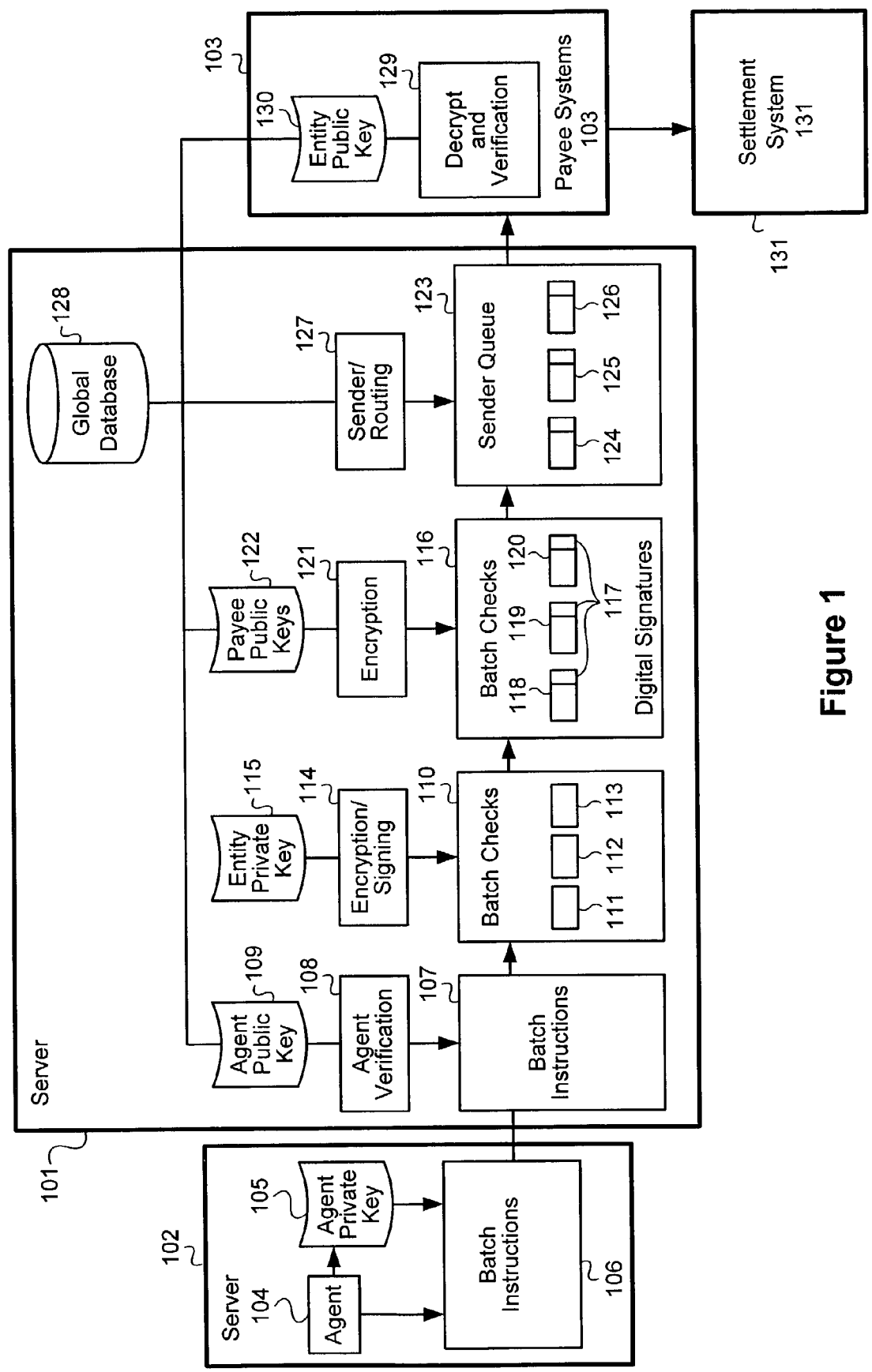
FIG. 1 is a block diagram of an electronic batch check authorization system according to the embodiment of the invention.

FIG. 1 is a block diagram of an electronic batch check authorization system according to the embodiment of the invention. FIG. 1 includes server 102, server 101, payee systems 103 and settlement system 131. Server 102 includes agent logic 104, agent private key 105 and batch instructions 106. Agent 104 operates upon batch instructions 106 in conjunction to with agent private key 105. Server 101 includes agent verification logic 108, which is operative upon batch instructions 107 using agent public key 109; encryption/signing logic 114, which is operable upon batch checks 110 using entity private key 115; encryption logic 121, which is operable upon batch checks 116 using payees public keys 122; and sender/routing logic 127, which is operable upon sender queue 123 using global database 128. Global database 128 stores agent public key 109, payee public key 122 and routing information that allows for checks to be sent to respective recipients. Batch checks on server 101 include checks 111, 112, and 113. Batch checks 116 include digital signatures, 117 on checks 118, 119 and 120. Sender queue 123 includes checks 124, 125 and 126.

Payee systems 103 are coupled to server 101. Payee systems 103 include verification logic 129 and entity public key 130. Entity public key 130 may be stored remotely on global database 120, rather than being stored directly on payee systems 103. Payee systems are coupled to settlement system 131.

Server 102 includes agent logic 104 which receives instructions and data from an agent, which may be a software agent interfacing with ERP systems or software that receives information from a human user agent. Agent 104 causes a set of batch instructions 106 to be created, which are instructions to create a set of checks signed with a digital signature of the agent's organization or the system. Agent 104 causes batch instructions 106 to be signed with a digital signature using agent private key 105. Agent private key 105 is a private key in a public/private key system. Items signed with the key can be verified with the corresponding key. Batch instructions 106 are uploaded, as batch instructions 107, on to server 101, which is not directly accessible by agent 104.

Agent verification logic 108 acts upon batch instructions 107 using agent public key 109 to verify that the instructions were sent by agent 104. Agent public key is used to verify a digital signature of the agent 104. Additional verification and authorization may be performed by agent verification 108. For example, a verification may be performed as to whether agent 104 has permission to create a batch of checks. Additionally, verification may be performed to determine whether particular checks within the batch are in a range of amount for which the agent has permission to create a batch-style check. According to other implementations, other verification schemes are performed upon the instructions such as for fraud detection and other purposes.

A batch of checks 110 is created from batch instructions 107. Digital signatures are added to such checks using a private key of the organization, entity private key 115.

According to other implementations, private keys from different signing authorities may provide signatures on behalf of the entity. For example, a private key associated with server 101 may be used as entity private key 115. Alternatively, another private key for which respective recipients have the corresponding public key may be used as entity private key 115. The signing of the checks is performed through an encryption process, in which the content of respective checks is encrypted using a one-way hashing algorithm and then signed using the entity private key 115. This encrypted content of the checks is appended to the respective checks, as shown in batch checks 116 with digital signatures 117 on checks 118, 119, and 120. These digital signatures are available to then later be verified using the public key of the entity, for example entity public key 130, in order to verify that the digital signature was created by the respective organization.

In order to help provide security, batch checks 116 are encrypted by encryption logic 121 using payee public keys 122. In order to read the respective checks, the recipients use their private keys, according to the public key/private key encryption/decryption scheme. This helps to prevent a third party from being able to read and/or use the checks. According to other implementations, the respective checks are first encrypted with a dynamically generated session key that is then encrypted with the payee public keys 122 and attached to the encrypted document. This approach has certain efficiencies in certain implementations as compared to encrypting the entire check with the public key of the payees. The keys, such as agent public key 109, entity private key 115 and payee public keys 122 may be stored in a global resource, such as global data base 128.

The batch of checks is stored in a queue, sender queue 123, in preparation for sending to respective recipients. Sender/routing logic 127 is operative upon sender queue 123 to schedule and send checks among the batch to respective recipients. Sender/routing logic 127, according to the embodiment of the invention, schedules sending of the checks according to instructions among the batch 107, which may call for a delay and different schedule dates upon which the checks are sent.

Checks from the batch are received by different respective entities. For example, here, entities are shown collectively as payee systems 103. Such payee systems use verification logic 129 to verify that the checks were sent by proper sender. Verification logic 129 may also implement fraud detection, which can cross check information in the respective checks with the information stored when the checks were created. The information that is checked includes information created on server 101 as the checks were created, according to one implementation. After verification of the checks, payee systems are operative to notify settlement systems 131, which settles payment. Settlement involves placement of the funds into the account of the payee. Alternatively, settlement is performed by reconciliation of debits and credits between payers and payees.

The items shown in FIG. 1 may be implemented as software processes and data structures in a computer system. For example, server 102, server 101, payee systems 103 and settlement system 131 may represent separate computer servers or other systems. Such computer systems include computer hardware, according to one embodiment of the invention, such as processors, memory and communications electronics. The servers, according to one embodiment of the invention communicate via a computer network. Alternatively, the functions shown in the different respective servers may commonly performed by a single server or may be distributed among different servers. Logical functions such as agent logic 104 may be implemented as a software processes.

For example, agent 104 may be defined in an object oriented program in scheme as agent object. Other implementations are possible. For example, agent 104 may be implemented as a software routine. Items such as batch instructions 106, batch checks 110, and sender queue 123 may be implemented as data structures stored in a computer memories or other storage device. Other implementations in software, hardware or other electronic technology are possible with respect to the functions and actions shown.

Figure 2:
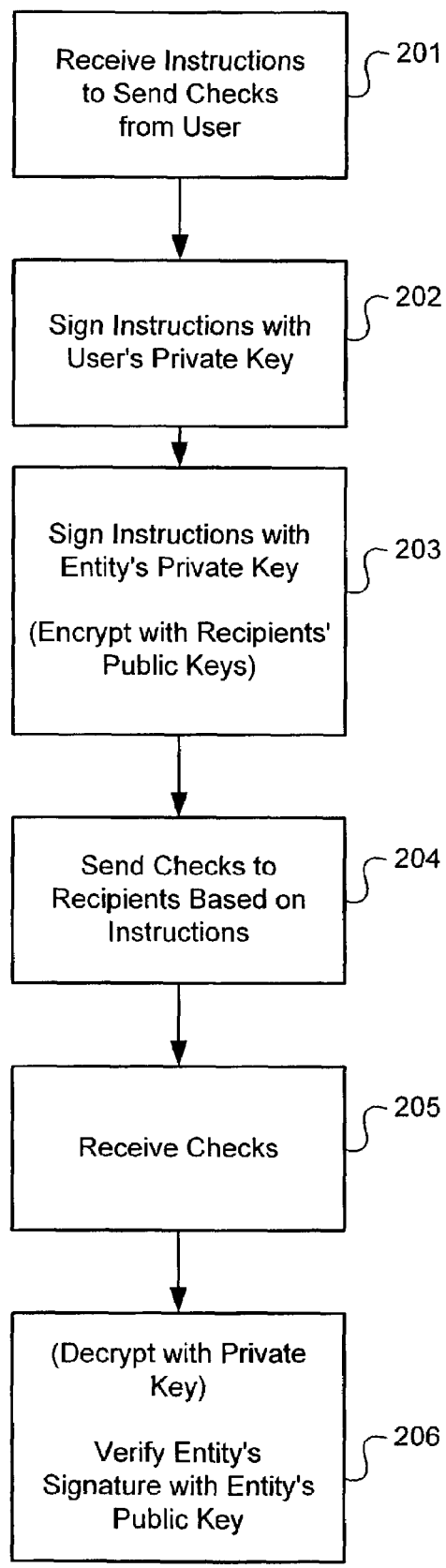
FIG. 2 is a flow diagram of electronic check authorization according to an embodiment of the invention.

FIG. 2 is flow diagram of electronic check authorization according to an embodiment of the invention. First, receive instructions from a user to send a set of checks (block 201). The instructions are signed with the user's private keys (block 202). This helps to ensure security, and in one implementation has the advantage of not providing the user with direct access to the entity's private key.

Next, the checks are signed with the entity's private key (block 203). An advantage of this approach is that similar steps may be taken by other users in order to use the same private key of the entity. Use of the respective user's private keys helps provide security in one implementation. Other entities can recognize the digital signature of the entity by using the entity's public key, and these other entities do not need to know the different public keys or identities of the respective users who sent the batch instructions. Alternatively, the checks are signed using a private key assigned to the system on which the checks are signed. According to one embodiment of the invention, the checks are signed with a private key corresponding to a public key to which the recipients have access. The checks are optionally encrypted with the public keys of the respective recipients.

After they are signed, checks are sent to respective recipients based on the instructions (block 204). The recipients receive the signed checks (block 205). If the checks have been encrypted, they are decrypted. The checks are decrypted using the private key of the recipient. After receipt of the checks, the entity's signature is verified using the entity's public key (block 206). Thus, the respective recipients are able to use a public key of the entity to verify the checks, even though the checks were created based on instructions signed with the user's private key. Alternatively, if the checks have been signed using another private key, the recipients are able to use the corresponding public key to which they have access to verify the checks, even though the checks were created based on instructions signed using the user's private key.

Figure 3:
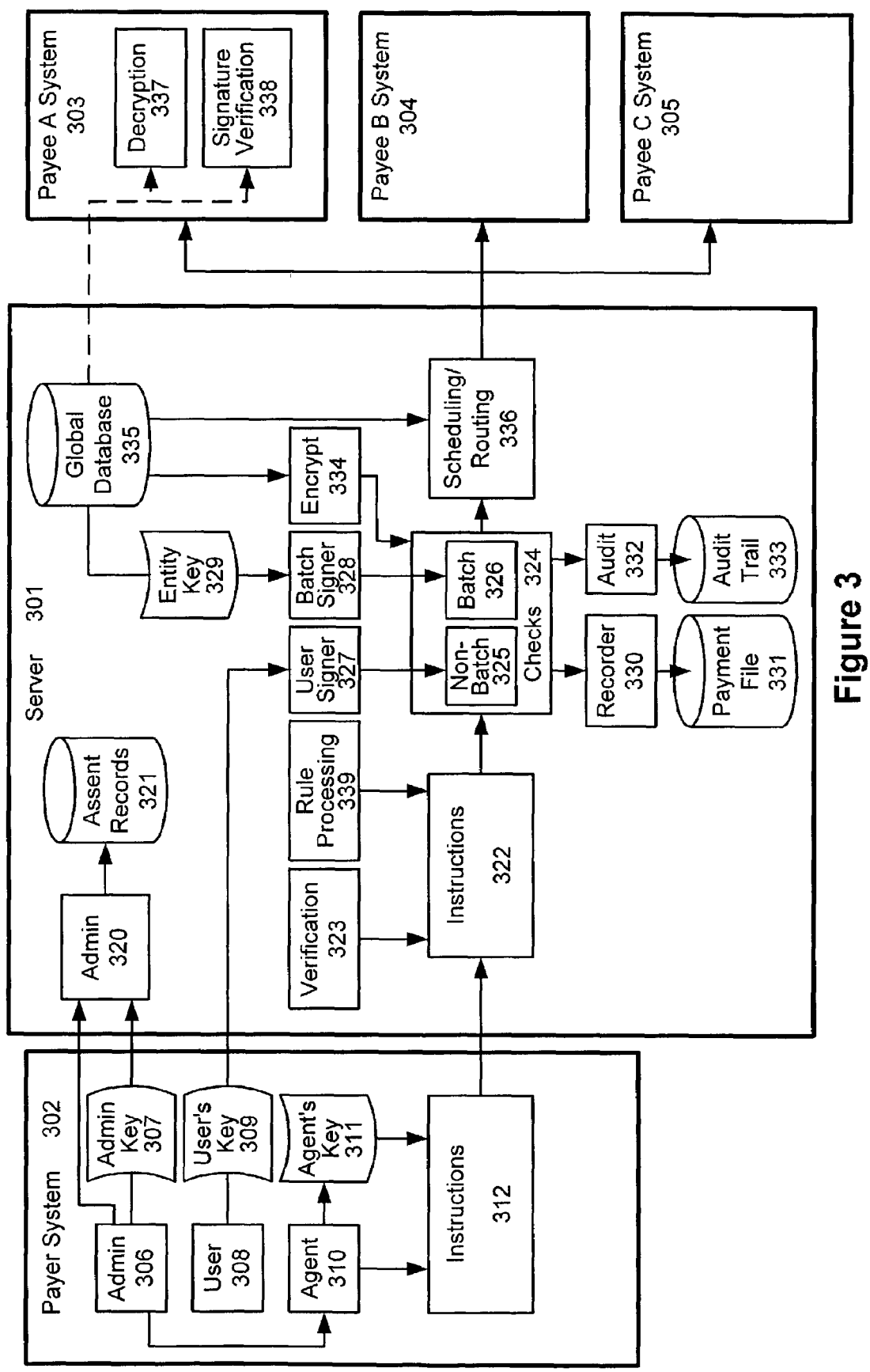
FIG. 3 is a block diagram of a system for electronic check authorization and receipt according to an embodiment of the invention.

FIG. 3 is a block diagram of a system for electronic check authorization and receipt according to an embodiment of the invention. The system in FIG. 3 includes payer system 302, server 301, payee A system 303, payee B system 304 and payee C system 305. Instructions are sent from payer system 302 to server 301 to cause server 301 to create a batch of checks using the digital signature of the entity associated with payer system 302. The checks are then sent to payee systems 303, 304 and 305.

Payer system 302 includes admin logic 306, user logic 308 and agent logic 310. Admin. logic 306 communicates with agent logic 310 and uses admin key 307. Admin. logic also communicates with admin logic 320 of server 301. Agent 310 using agent's key 311, both of which are also located on payer system 302.

Server 301 includes admin logic 320, assent records 321, instructions 322, verification logic 323, rule processing 329, user signer logic 327, batch signer logic 328, encryption logic 334 and scheduling/routing logic 336. Also, included on server 301 are global database 335, entity key 329, checks 324, recorder logic 330, audit logic 327, payment file 331, and audit trail 333. Checks 324 include non-batch checks 325 and batch checks 326.

The following is a description of certain relationships among the items in server 301 and between such items and certain other items shown in FIG. 3. Admin logic 320 of a server 301 communicates with admin logic 306 of payer system 302 and receives signatures using admin key 307 of payer 302. Admin logic 320 communicates with assent records 321. Verification logic 323 and rule processing logic 329 are operative upon instructions 322. User signer logic 327, batch signer 328 and encryption logic 334 are operative upon checks 324. Batch signer uses entity key 329, which is obtained from global database 335. Encryption logic 334 uses information from global database 335.

Scheduling/routing logic 336 receives checks 324 and uses information from global database 335 to send to respective payee systems 303, 304, and 305. Recorder logic 330 and audit logic 332 store information regarding checks 324 in payment 331 and audit trail 333 respectively. Systems to which checks are sent include payee A system 303, payee B system 304 and payee C systems 305. Payee A system 303 includes decryption logic 337, and signature verification logic 338. Other payee systems include similar logic.

Agent logic 310 is authorized to create a respective set of instructions to send checks using the key of the entity associated with the payer's system through an administrative set up process. Admin logic 306 on payer system 302 is operative with admin logic 320 on server 301 in order to create such authorization. The setup involves admin 306 using admin key 307 to show that the respective entity agrees to the set up. The key is used to sign a document indicating the respective terms and conditions of the agent's use and the entity's responsibility for the agent's use of the batch check system. This consent is digitally signed by the administrator and using the admin key 307. The digitally signed consent is stored in assent records 321. Such records may be used in a case where the entity associated with payer's system 302 attempts to repudiate a transaction made by agent 310. The assent records 321 help to show that the respective entity agreed that it would be responsible for the actions of agent 310.

Server 301 creates a set of checks in response to instructions from payer system 302. Agent logic 310 on payer system 302 creates a set of instructions 312. Instructions 312 created by agent 310 with agent's key 311 are sent to server 301 and are received as instructions 322. Instruction 322 are processed and verified by verification logic 323. According to one implementation, verification logic 323 checks, using digital signature of agent 310, as to whether the instructions were actually sent by agent 310. Such verification may be performed through using the public key of the agent. Other types of verification for fraud detection may be performed. Rule processing logic 339 verifies various aspects of instructions in accordance with rules established as to the authority of the agent to send sets of checks using the digital signature of the entity. For example, in one implementation, checks only within a certain monetary amount range may be sent using such a process. Additionally, in another implementation, additional signature(s) are needed for checks in certain ranges of amount. Such signatures may be obtained through a user dialogue between payer systems 302 and server 301, such as between user 308 and user signer logic 327. User logic 308 user's key 309 to sign the respective document. Instructions 322 may include instructions regarding checks other than a set of checks for which the entity's digital signature is used. Such checks are shown in FIG. 3 among checks 324 as non-batch checks 325. A separate signature is used for such checks. User signer logic 327 is operative upon non-batch checks 325 to add such a digital signature to such checks.

Batch checks among 326 among checks 324 are signed by batch signer logic 328 using entity key 329, which is a private key corresponding to a public key to which the recipients have access. For example, entity key 329 is a private key of the entity that is associated with payer system 302. According to one implementation, entity key 329 comprises a private key assigned to the system on which batch checks are created and for which the recipients have access to the corresponding public key. After signature, checks in batch of checks are encrypted by encrypt logic 334. The checks are encrypted to help provide security when they are transmitted. Encrypt logic 334 is operative upon checks 324 to encrypt such checks before sending. Encrypt logic 334 uses public keys of recipients and in global database 335 in order to perform the encryption.

Recorder logic 330 records the various checks created and stores such information into a payment file 331. Such check information is available for verification, as may be performed for fraud detection. For example, according to an embodiment for the invention, payee systems, such as payee system A 303, may verify information in payment file 331 to determine the authenticity of the respective check. Information regarding checks 324 also is recorded by audit logic 332 and stored in audit trail 333. This information may be used for audit and accounting purposes by an entity associated with payer system 302.

The checks are scheduled to be sent according to instructions 322 or other scheduling instructions. The checks are then sent to the respective recipients by scheduling/routing logic 336. Scheduling/routing logic 336 uses information in global database 335 regarding addresses of the respective recipients. Such addresses may comprise emails addresses or other routing addresses. Checks are sent electronically to the respective recipients by e-mail, electronic data interchange (EDI) or other electronic means. Checks are received by respective recipients, for example, payee A system 303. A check is decrypted using public key and private key process in decryption logic 337 in payee A system 303. Signature verification takes place in signature verification logic 338, in order to determine that the entity associated with payer system 302 actually has sent the check. Signature verification is carried out using the public key corresponding to the private key with which the check was signed. For example, signature verification is carried out using the public key of the respective entity that sent the check and digital signature.

The items shown may be implemented in various forms of computer and electronic hardware and software. For example, payer system 302, server 301, payee A system 303, payee B system 304 and payee system 305 may be implemented on separate computer server systems. User computer system may include computer hardware such as a processor, memory, other storage in input/output (I/O). Functions shown such as admin logic 306, agent logic 310, and batch signer 328 may be implemented as a software processes. Such software processes may be implemented in various forms such as software objects or other types of software procedures or processes. Alternatively, functionality shown may implemented in other forms of electronic or computer hardware and/or software. Items such as global database 335 and payment file 331 may be implemented software data structures stored in computer memory including volatile memory and/or fixed hard drives or other forms of a memory or storage. Other implementations of the functions shown are possible and included within the scope of the invention.

Figure 4:
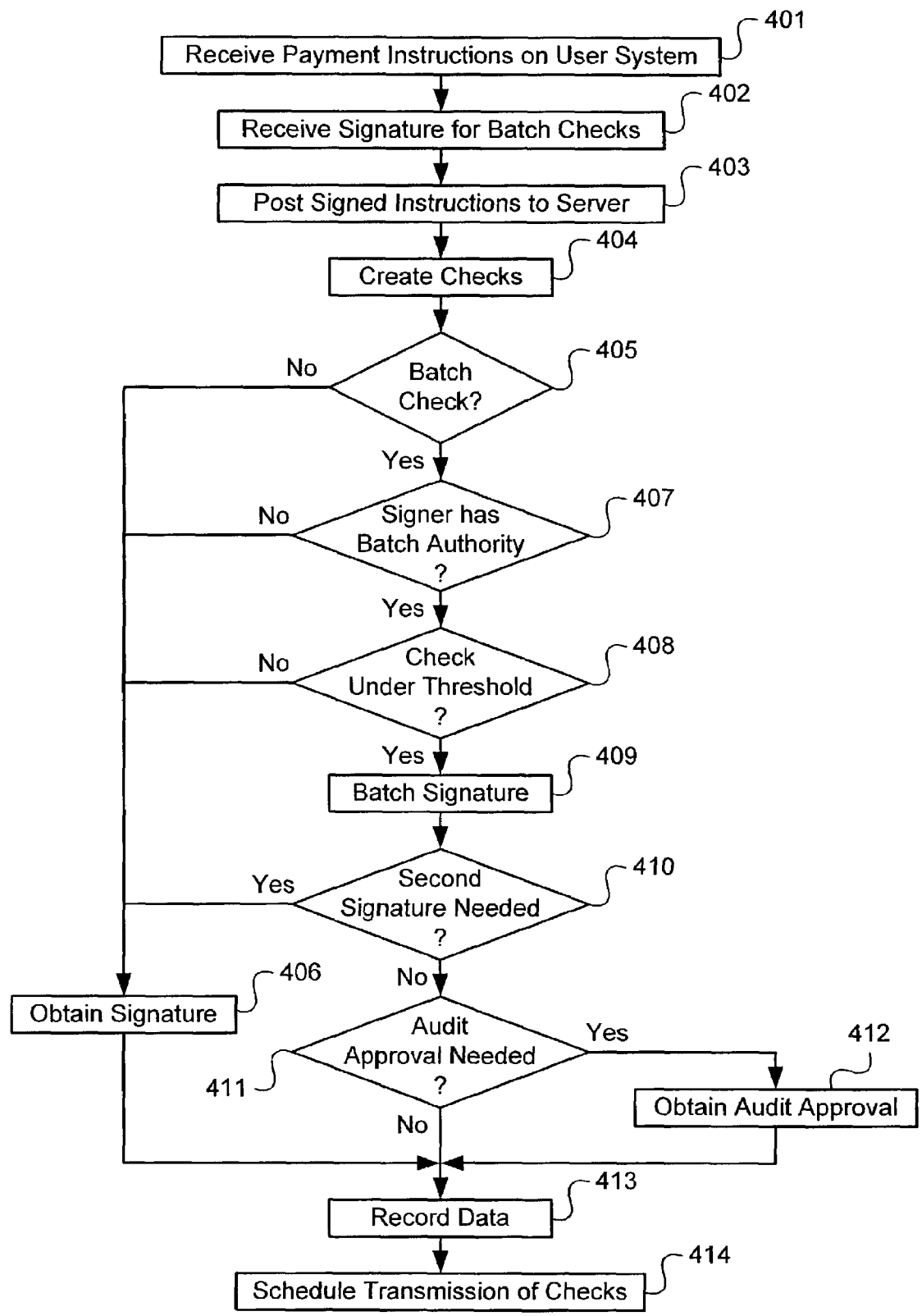
FIG. 4 is a flow diagram for electronic check authorization with additional signature according to an embodiment of the invention.

FIG. 4 is a flow diagram for electronic check authorization with additional signature according to an embodiment of the invention. Payment instructions are received on a user system (block 401). A signature is received for the batch of checks in the user system (block 402). This signature is typically from an agent and is a different signature than the one with which the batch checks are actually signed. The instructions are posted to the server (block 403). Checks are created based on the instructions (block 404). For checks in the set of checks created, it is determined whether each respective check is a batch check (block 405). If a check is not a batch check, obtain the respective signature from the authorization employee (block 406). Then after obtaining such signature, record payment data (413).

If a check is a batch check (block 405), then next determine whether the signer of the instructions has batch check authority (block 407). If the signer of the instructions does not have batch check authority, then obtain a signature from an authorizing employee (block 406) and continue on to recording of the data (block 413). If the signer of the instructions has batch check authority (block 407), then determine whether the amount of the check is under the threshold set for such signer (block 408). If the signer does not have such authority, if the check is not under such threshold, then obtain the respective signature of an authorizing employee (block 406) and proceed to recording data (block 413). If the check is under the threshold (block 408), then perform a batch signature using the digital signature which the recipients are able to verify, such as a digital signature of the entity (block 409).

Next, determine whether a second signature is needed (block 410), and if such a signature is needed, obtain the signature (block 406), and proceed to recording the data (block 413). If such signature is not needed (block 410), then determine whether audit approval is needed (block 411). If audit approval is need (block 411), then obtain the audit approval (block 412) and proceed to recording data (block 413). If an audit approval is not needed (block 411), then proceed to recording the data (block 413). The recording data (block 413) may include recording payment data for use in fraud detection so that such data may be compared upon receipt of checks by payees with this data and data recorded may also include data needed for audit purposes. According to one implementation, payment data includes the name of the recipient, remittance information, amount, date and other identifying information, or various combinations of such information. Schedule the transmission of the checks (block 414).

Figure 5:
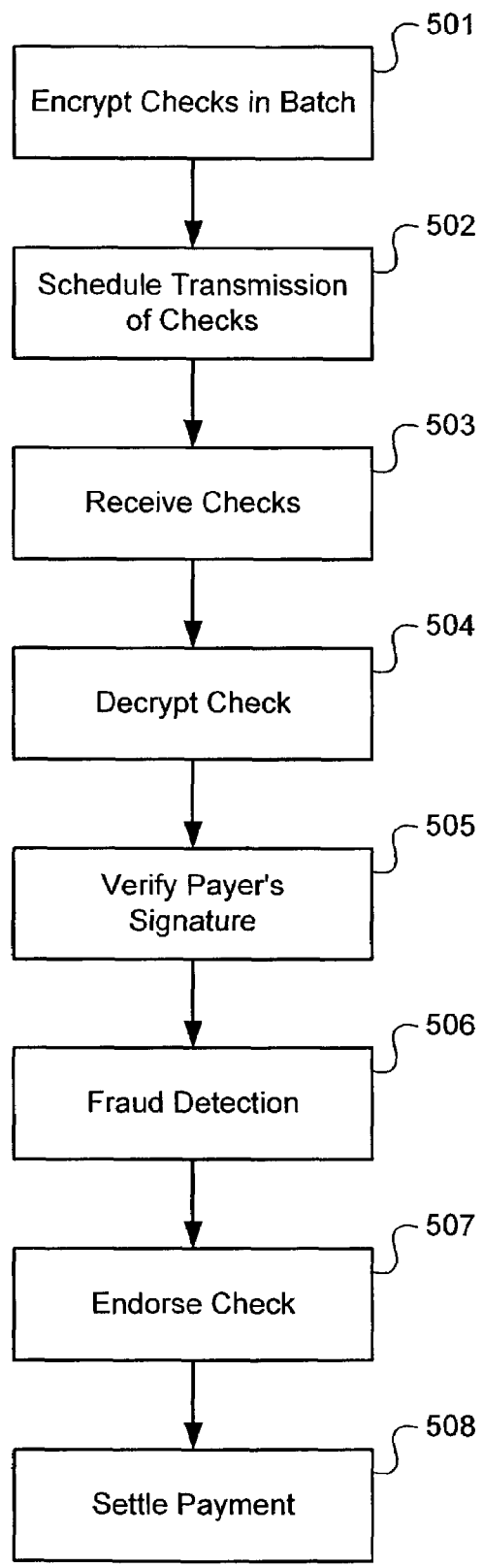
FIG. 5 is a flow diagram of electronic check batch preparation, encryption, transmission and receipt according to an embodiment of the invention.

FIG. 5 is a flow diagram of electronic check batch preparation, encryption, transmission and receipt according to an embodiment of the invention. Checks in a batch of checks are encrypted using public keys of the recipients, such as the batch of checks described previously in this application (block 501). Next, transmission of the batch of checks is scheduled (block 502). Checks from among the batch of checks are then received by recipients (block 503).

When received, a check is decrypted (block 504) using the private key of the recipient. The signature and identity of the payer of the decrypted check is verified (block 505). Such verification, according to embodiment of invention, includes using a public key of the entity associated with the payer to decrypt the digital signature of the payer included in the check. According to another implementation, the respective public key corresponding to the private key used to sign the check is used to verify the digital signature of the payer included in the check. Next, perform fraud detection on the received check (block 506). After such fraud detection, endorse the check (block 507) and settle payment (block 508). Settling payment may include the recipient sending the check to the recipient's bank and the recipient's bank sending a request of over a supplemental network. The supplemental network causes the payer's bank settle payment with the recipient's bank according to one implementation.

FIG. 6(a) is a user interface of role permission set-up according to an embodiment of the invention. User interface includes menus 602, interface for a changing role limits or permissions 603, interface for changing permissions for the role 604 and interface for changing bank account authorization for the role 605. Menu 602 includes the following selections: users 607, account 608, suppliers 609 and control 610. Currently item users 607 is selected. This menu item includes users 611, new users 612, roles 613 and new role 614.

Interface to change role limits or permissions 603 includes a role name entry 615, role description entry 616, authorization box for user management authority 617, authorization box for account management authority 618, daily signing limit entry 619, check signing limit 621, no daily signing limit entry 620 and check cosigning limit 622. Interface for entry of permissions for role 604 includes entry for view payment 623, audit/approve release of payment 624, payment 625, import/sign payment instruction file (PIF) 626, void payment 627, hold payment 628, stop payment 629, create manual PIF 630 and rubber stamp PIFs 631. Entry for bank account authorization for this role 605 includes account name column 632, account number 633, account number 634, and account type 635. In this example, row 636 includes "marketing" for account name 632, which refers to account number 02664 (in column 633) and checking description (in column 635).

User interface 601 allows a system administrator to view and/or set up the attributes of a user with respect to the ability of a user to sign checks or take other actions. For example, a daily signing limit 519, check singing limit 621, and check co-signing limit 622 may be established for a particular role. This role, then may be applied to various users once it is established. The role has various permissions, such as shown in input for permissions for the role 604. According to various embodiments of the invention, subsets of the such permissions may be selectable in a user interface. The advantage of such an approach is that a role may be established and used over a set of different users. Input 606 is typically shown when a role is assigned to a particular user.

Figure 6B:
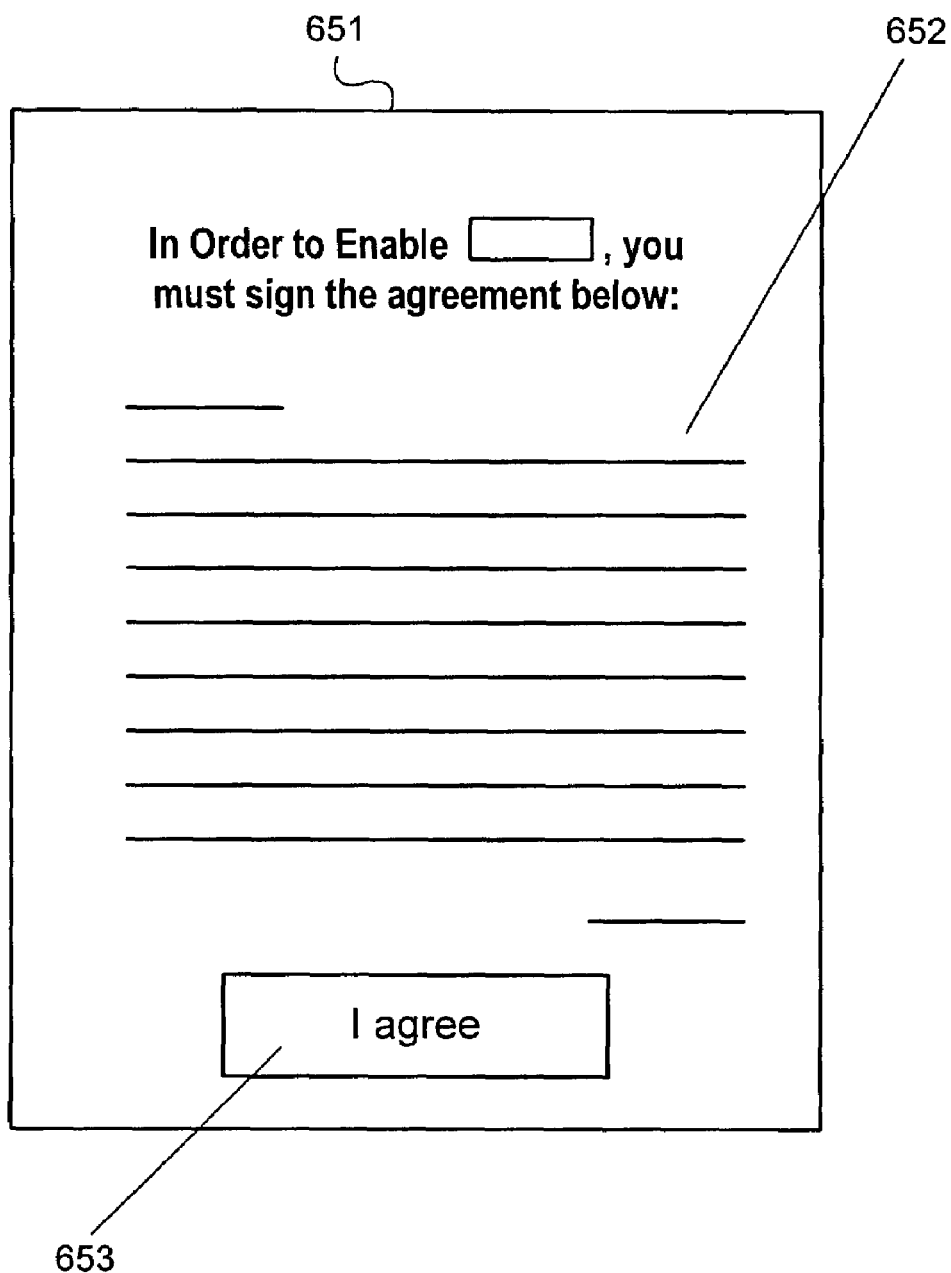
FIG. 6(b) is a user interface of user permission authorization according to an embodiment of the invention.

FIG. 6(b) is a user interface of user permission authorization according to an embodiment of the invention. When the system administrator attempts to assign certain rights to a particular user, the system administrator must indicate that the entity who the system administrator represents agrees to certain terms and conditions. These terms and conditions are shown as terms and conditions 652 in window 651. By clicking I agree, the administrator shows acknowledgement with agreement with the terms and conditions. Additionally, the system accepts the system administrator's password and use of the system administrator's private key to set up certain kinds of permissions. For example, to set up the particular user to be authorized to send batches of checks would require such authorization with digital signature according to an embodiment of invention.

Figure 7:
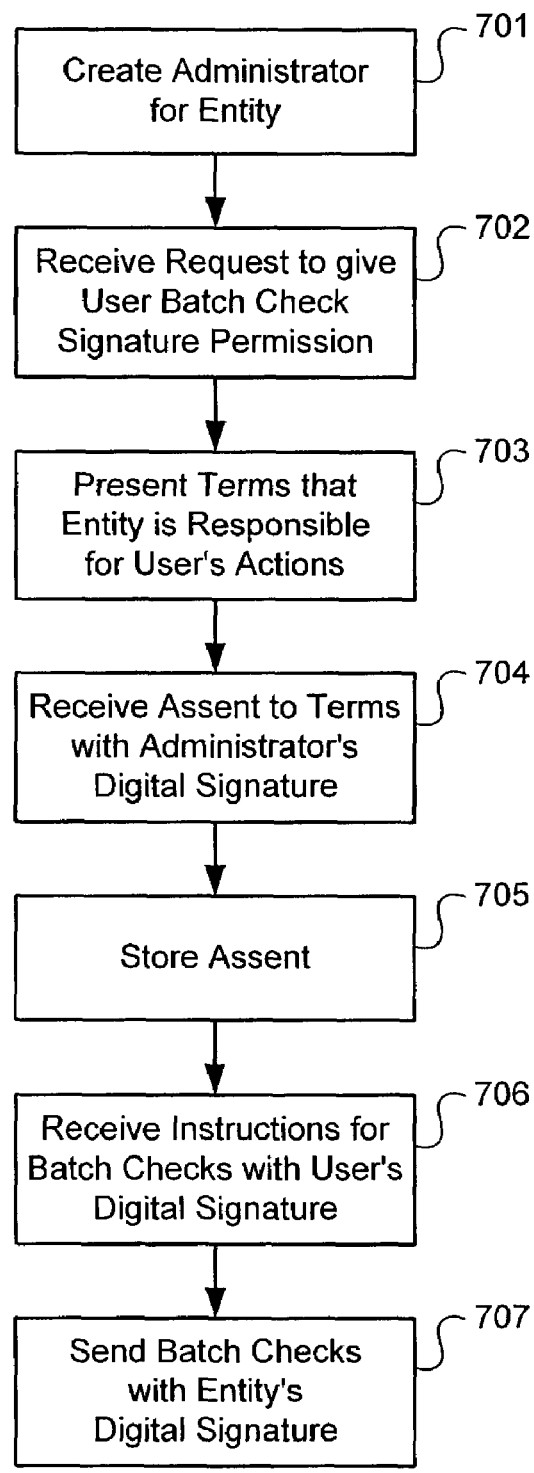
FIG. 7 is a flow diagram of role permission set up according to an embodiment of the invention.

Permissions for the role may include the permission to allow batches of checks to be signed using a digital signature of the organization, or in an alternative implementation, another digital signature that recipients can verify. Such digital signature would not be directly acted upon by the user, but would be caused to occur through a set of instructions signed with the user's digital signature. As shown here, such a permissions is entitled rubber stamp PIFs entry 631. Upon selection of such permission, the associated role would have such capability. Then upon assigning the role to user, the system would receive an assent from the system administrator in which the system administrator uses the system administrator's digital signature to show agreement for such assignment FIG. 7 is a flow diagram of role permission set up according to an embodiment of the invention. An administrator is created for the entity. This administrator is able to set up various roles for use in the system associated with the entity. For example, the administrator is capable of setting up a role for a user or software agent to have permission cause sets of checks to be signed with the entity's digital signature. First create an administrator for the entity. Such a process may include additional verification that ensures that an individual has the appropriate permission from the entity to act as the administrator.

After the role of the administrator is created, a request to give a user permission to cause batch signatures of checks to occur using the digital signature of the entity, or in an alternative implementation, another digital signature that recipients can verify is received (block 701). This request is received from the administrator of the entity. In response to such request, present terms to the administrator indicating that the entity is responsible for the user's actions (block 703). Such terms may be presented in the form of a dialog box and require that the administrator sign assent to the terms using the administrator's digital signature. The terms for example may include language similar to the following:

"Automated 'rubber stamp' signature process authorization. By selecting this feature, Customer can (also referred herein as "you" and "your" is requesting that Facilitator enable the disburser application to allow automated digital signing and approval of payment instructions that are uploaded to the payment exchange system through a plug-in agent software ("ERP agent"). To complete this request, exchange company requires that you click the "I agree" button below and then digitally sign this request. The person accepting this agreement must be the primary disburser application administrator who has authority to authorized users and accounts in the disburser. You must accept this agreement from the workstation where your digital certificate is stored in order to complete the digitally signed form."

Next, the assent to such terms with the administrator's digital signature is received (704). Such assent, according to the embodiment of the invention, takes place through the system administrator or the system receiving the acceptance of the agreement from the workstation where the digital certificate of the administrator is stored. Next, the assent is stored (block 705). Such storage may take place by storing the digitally signed version of the terms and conditions with the digital certificate of the administrator. Instructions are then received to the created batch of checks with the user's digital signature (for the user for which the administrator has provided permissions) (block 706). In response to such instructions, a batch of checks with the entity's digital signature (or, in another implementation, another digital signature that the recipients can verify) is sent according to the recipients in the instructions (block 707).

Figure 8:
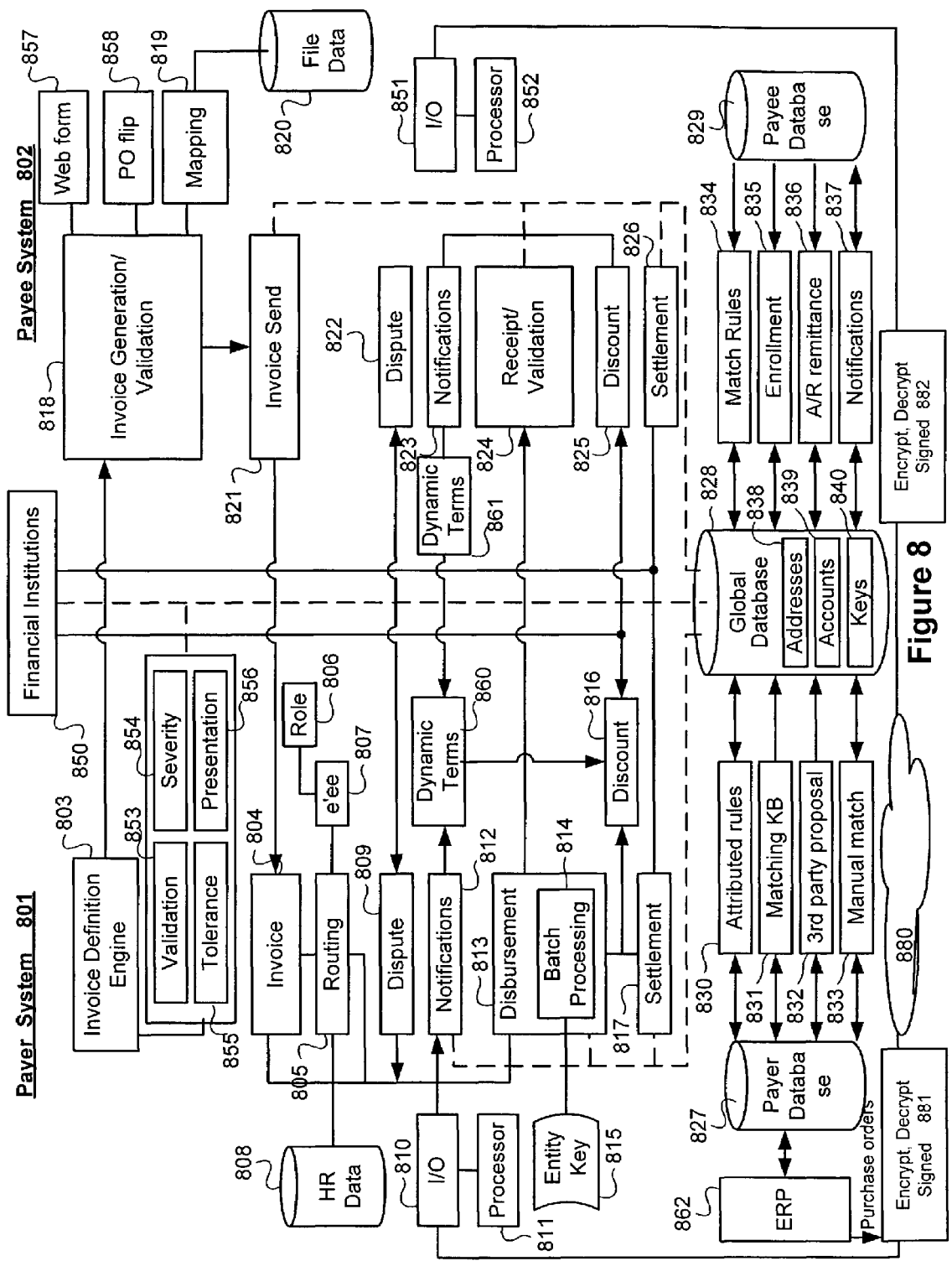
FIG. 8 is a system diagram of an electronic payment system according to an embodiment of the invention.

FIG. 8 is a block diagram of a system according to an embodiment of the invention. The system allows a paying entity to define the invoice format for invoices it wishes to receive. The system facilitates routing, editing, dispute resolution, and disbursement of payment. The system includes payer (buyer) shown as 801, payee (vendor) shown as 802, and financial institutions shown as 850. The system has the following characteristics according to one implementation: collaborative network model, A/P (buyer) centric enterprise software, plugging into existing ERP systems, full cycle bill-to-pay functionality, web-based A/R (vendor) software, and co-existence with the customer existing bank relationships.

The collaborative network model supported by the unique collaborative vendor reconciliation engine between global directory shown as 828 and A/P centric master vendor list shown as 827. The reconciliation engine provides methods of matching existing vendor name/address with self enrolled vendor information in the global directory. These methods include: fuzzy attributed weight based matching shown as 830, previous vendor histories of matching in the knowledge based shown as 831, third party outsourced recommended matching proposal shown as 832, and manual interactive selection from buyers shown as 833. Each vendor is represented by several critical attributes in the global directory: addresses shown as 838, real and alias accounts shown as 839, and keys shown as 840. Vendor entries are pre-populated with information uploaded from the buyer ERP system. The vendor enrolls via the online self-service enrollments 835. Vendor also provides additional rules to match 834, A/R remittance format attributes 836, and notification rules/addresses 837.

Accounts payable (A/P) buyer-centric enterprise software associated with payer system 801 includes several key unique functions. These functions include buyer defined electronic invoice exchange, routing/editing and approval, and dispute resolution. Payer system 801 includes invoice definition engine 803, invoice 804, HR organization data 808, routing/editing logic 805, dispute logic 809, notifications logic 812, disbursement logic 813, dynamic terms logics/offers 860, discount logic 816 and settlement logic 817. Also included on payer system 801 are input output (I/O) 810, processor 811, entity key 815, and payer central repository database 827. The invoice definition engine 803 includes validation logic 853, tolerance/replacement items 855, interaction severity 854, and several presentation forms 856. This definition engine is controlled by payer helps provide clean invoice data from payees. The definition logics (853, 854, 855, and 856) can be configured to specific payee or a specific group of payees.

Invoice definition engine 803 and its definition logics are exposed to payee via global directory and are operative with invoice definition/generation/validation 818 of payee system 802. The routing/editing logic 805 includes business logic that governs how an invoice will be processed by AP clerks, and what data entry information will be required to complete the transaction. Routing/editing logic 805 can operate differently based on multiple attributes: document type, document value, discount value, etc. Routing/editing logic 805 acts on HR organization database 808 to define routing/editing/approval work flow based on employee information 807 and role values 806. Invoice 804 is coupled into routing logic 805. Routing logic 805 is coupled with employee logic 807 and role assignment 806. Routing logic 805 is coupled with HR data 808 and with dispute logic 809, notifications logic 812 and disbursement logic 813 of payer system 801. Notification logic 812 is configured by the payer, and includes collaborative filtering, and mappings status and notification definitions between internal to external payees. These collaborative filtering and mappings can be designated to a payee or a group of payees.

Dispute logic 809 is set of payer defined centric collaboration rules and interactions between payer and payee to resolve issues related to invoice or other exchanged documents. Some disputes are simple (e.g., number of items is received, etc.) while others are more complex (e.g., replacement items do not meet part specification and price). The outcomes of a dispute are partial payments, partial invoices, new invoices, or other outcomes. According to one implementation, a dispute can only be finalized by payer and its members, and some finalized exchanges will require digital signature to ensure non-repudiation. The payer dispute logic 809 orchestrates with payee dispute logic 822. Payer dispute logic, references, and history are stored in payer central repository 827.

A/R web based centric software associated with payee system 702 helps provide an online self-service payee system. Payee system 702 includes a processor 852 and input/output (I/O) 851. Such processor 852 and input/output 851 allow for communication with other entities such as payer system 801, financial institutions 850 and global database 828. Processor 852 and processor 811 of payee 802 and payer 801 respectively may run various software processes to implement the logic shown. The processes may be implemented as software objects, routines or other software processes, programs or implementations. Alternatively, portions of such logic may be implemented in hardware logic or other forms of logic. The functions shown may alternatively be implemented on a common server or in a distributed set of computer systems separated over a computer network, or other configuration that achieves the logical functions shown. Data and information such as for global database 828 may be stored in data structures or other data format and stored in computer memory, fixed storage or other data storage or archived in various implementations of the invention.

Payee system 802 includes invoice generation/validation logic 818, invoice send logic 821, dispute logic 822, notifications logic 823, receipt/validation logic 824, discount logic 825 and settlement logic 826. Invoices or other documents can be submitted to payer via multiple mechanisms. Three sample mechanisms are shown here: Web forms shown 857, purchase order pre-populated invoice (PO flip) 858, and electronic file submission via file mapping 819. The Web forms 857 are a set of payer defined presentations that can be selected and/or authorized to be used by payee(s). Payee can also define additional payee private attributes and fields to be used during A/R matching as well as graphic materials (such as company logo, etc.). The PO flip 858 uses information from purchase orders which are transmitted to payee from payer to pre-populate the invoice data. The status of each purchase order is maintained within the payee central repository to support blanket purchase orders. File mapping 819 is used by the payee to automate the bulk invoice submission process. Normally, these file are exported from payee's A/R system. The mapping defines how payee's data will be mapped into payer, as well as default/validation/transformation rules. Upon submission of these invoices or other documents via multiple mechanisms (857, 858, 819). The documents are validated based on the payer definition engine 818. This definition engine 818 includes payer definition engine 803 and its components: validation 853, severity 854, tolerance 855 and presentation 856.

Invoice generation/validation logic 818 is coupled with mapping logic 819 in communication with file data 820. Invoice generation/validation logic 818 is coupled into invoice send logic 821. Dispute logic 822 is coupled with dispute logic 809 of payer system 801. Notifications logic 823 is in communication with notifications logic 812 of payer system 801 and discount logic 825 of payee system 802. Receipt/validation 824 of payee system 802 is in communication with disbursement module 813 of payer system 801. Settlement logic 826 is operative with discount logic 825 of payee system 802 and receipt/validation logic 824. Global database 828 is available to notifications logic 812 and 823, disbursement logic 813, settlement logic 817 and 826, invoice send logic 821, receipt 821 and receipt/validation logic 824.

Global database 828 is in communication with payer database 827 through attribute match rules 830, knowledge based history matching samples 831, third party recommendation/proposal 832 and manual interactive matching by payers 833. Global database 828 is in communication with payee database 829 through match rules 834, enrollment logic 835, remittance formats 836 and notification preferences 837. Global database includes items such as address 838, accounts 839 and public keys 840. Payer database 827 is located with payer system 801 and payee database 829 is located with payee system 802. Global database 828 is also available to financial institutions 850.

Through invoice definition engine 803 a payer uses payer system 801 to define the invoice that the payer wishes to receive. Such definition helps to increase efficiency in the payer system because the resulting invoice from the payee, such as a seller, is more likely then in the proper data format when it is received. Payee system 802 generates an invoice based on the defined invoice in invoice generation/validation logic 818. The input data for the invoice is validated based on the invoice definition rules defined in payer system 801. If file data is used to automatically map into an invoice, such mapping is performed in one embodiment of the invention by mapping logic 819. Mapping logic 819 receives the file data 820 with information to be populated into respective invoices. File data 820 may contain files with data for invoices for various payers who have purchased good or services from the payee. When an invoice is completed it is sent through invoice send logic 821 to payer system 801. Additional information regarding definition of invoice by the buyer and use of related invoice rules is contained in United States patent application entitled System and Method for Electronic Payer (Buyer) Defined In voice Exchange, application Ser. No. 10/155,840, invented by Duc Lam, Ramnath Shanbhogue, Immanuel Kan, Bob Moore and Xuan (Sunny) McRae, which is incorporated herein by reference in its entirety.

An invoice is received at payer system 801 as shown here with invoice 804. The invoice is routed to the respective employees or other agents for its review and approval. Some approval may require additional signatures according to one embodiment of the invention. As shown here, employee logic 807 is in communication with routing logic 805 to allow an employee to authorize, audit or view respective invoice or check information.

Routing logic 805 is also used to route checks or other documents to various employees for signature or approval using HR data 808. Routing logic 805 uses HR data 808 to determine the correct employees to whom to route the respective document, such as in an invoice or check. Routing may be made to the manager of a respective employee if the employee has not responded in a certain time to the document. Such the choice of such manager to whom to route is made based on the management hierarchy in the organization stored in HR database 808. Such database is extracted from a human resource management system (HRMS), in one implementation of the invention. Additional information regarding routing of documents in the system is described in United States patent application entitled Method and System for Invoice Routing and Approval In Electronic Payment System, application Ser. No. 10/155,853, invented by Bob Moore and Xuan (Sunny) McRae, and which is incorporated herein by reference in its entirety.

A user of payer system 801 may dispute an invoice or other payment request through dispute logic 809. Dispute logic 809 is in communication with dispute logic 822 of payee system 802. This allows for communication regarding a dispute between a payer and a payee. The dispute may be only initiated and finalized by a payer. According to one embodiment of the invention, the dispute may be finalized only by the buyer, or the payer system. The dispute includes the capability to indicate that particular items in an invoice are disputed, such as the tax. The dispute logic 809 and 822 include the capability for individuals using the payer system 801 using payee system 802 to engage in a chat dialog. For additional discussion regarding electronic dispute resolution in such a system, refer to United States patent application entitled Method and System for Buyer-Centric Dispute Resolution in Electronic Payment System, application Ser. No. 10/155,866, invented by Duc Lam, Celeste Wyman and Xuan (Sunny) McRae which is incorporated herein by reference in its entirety.

Notifications logic 812 communicates completion of various stages of approval or other issues of status regarding invoices and disbursement. For example, when an invoice is approved notifications logo 812 communicates a notification to notifications logic 823 of payee system 802. Based on such notifications, a discount may be enabled through discount logic 816, which is in communication with discount logic 825 of payee system 802. For example, where an invoice is approved, a discount may be enabled based on an agreement or outstanding dynamic terms offers shown as 860 that the corresponding payment is made earlier than required under the original terms and conditions. Dynamic terms are additional real-time terms, a set of rules, and/or goal seeker that are established by payer 860 or payee 861. These dynamic terms rules 860 and 861 are based on business event types (invoice approval, purchase order approval, etc.), a payee or group of payee and a set of new discrete or variable terms. These dynamic term goal seekers allow payer and payee to set desirable outcomes. These dynamic terms can be pre-negotiated up-front or in real-time based on business event types. The approval of these new terms may require digital signature of either payer or payee. Also, third party financial institutions could be involved to provide funding for payee in returns for early discounts. For additional information regarding discounts facilitated by the system, dynamic terms (860 and 861) and discount logic 816 and 825 please refer to US patent application entitled System and Method for Varying Electronic Settlements between Buyers and Suppliers with Dynamic Discount Terms, application Ser. No. 10/155,806, invented by Don Holm, Duc Lam and Xuan (Sunny) McRae which is incorporated herein by reference in its entirety.

To facilitate complete bill-to-payment functionality, the system in FIG. 8 includes disbursement logic 812 and settlement logic 817. Disbursement logic 813 includes all payment routing, signing, and approval logic for respective invoices or other requirements for payment. Some payments will require multiple signatures to be signed based on payment amount and/or destination payee(s). Digital signatures and nondigital signatures may both be used. Also, payer can configure to control new settlement date for the payment by defined payee group and number of business/calendar days to be adjusted. The disbursement logic also includes auditing capability with multiple levels based on number of signatures and/or amount. In one implementation, disbursement logic 813 makes such disbursement in the form of electronic checks in one implementation. Such electronic checks are generated and signed with a digital signature. The digital signature may be obtained from respective users such as through a routing process using routing logic 805 to obtain a signature from employee logic 807 with role assignment digital key 806.

Alternatively, a set of instructions may be received to send a set of checks that use a digital signature of the payer organization rather than the digital signature of an employee. Such check processing may be accomplished through batch processing logic 814 and disbursement logic 813. Such batch processing logic 814 uses an entity key 815, which is a private key of the payer's organization. Batch processing logic 814 requires particular authorization for the respective instruction. The authorization may require that the agent requesting the set of checks sign the instruction with the agent's private key. Receipt/validation logic of payee system 802 is in communication with disbursement logic 813. Receipt/validation logic 824 receives payment, such as in the form of electronic checks. Such electronic checks are validated to assure that they are accurate. Receipt/validation logic decrypts any encrypted documents, for example if the electronic checks are encrypted with the public key of payee system 802, such checks are decrypted. Additionally, the digital signature of the sender is authenticated in receipt/validation logic 824. Such authentication is accomplished using the public key of the payer, which corresponds to the private key of the payer's organization (entity key 815) that was used in batch processing logic 814 (entity key 815). Additionally, verification may be made against a payment database generated by the payer system when the checks are created in order to assure that the checks were actually sent by the payer system.

Settlement logic 817 allows for settlement of payment between a payer system 801 and payee system 802. Settlement mechanism includes exiting combination of paper based checks, standard domestic electronic payment network (Fed Wire, ACH, CHIPS, etc.), international electronic payment networks (SWIFT, Bolera, etc.), propriety private payment networks (VISA, MasterCard, and American Express, etc.), and internal account bank transfer (On-us, etc.) For example, settlement may be made through debits and credits in a database within the system. Alternatively, settlement may be performed through an external network such as the ACH network with financial institutions involved, such as financial institutions 850.

Settlement logic 817 supports standard fund transfer model (buyer's account will be debited and supplier's account will be credited.) and good funds model (buyer's account will be debited and a temporary account will be credited. Upon receiving fund availability in temporary account, the supplier will be credited). Settlement logic 817 is implemented via issuing requests to the settlement network. Such request can be file-based requests such as ACH or transactional request such as VISA networks. For each request, there will be associated confirmation ID to ensure the trace ability of each transaction.

Global database 828 is available for use by elements that send payment, such as disbursement logic 813 and settlement logic 817. Global database 828 is also available for elements that send other documents or information between payees and their respective financial institutions. For example, invoices may be sent based on the respective recipient address as stored in the global database 828. Thus, invoice sends logic 821 is in communication with global database 828.

Global database 828 includes addresses and account information for respective payers and payees who use the system. Links are created between items in the global database and other databases in order to allow for the global database to be updated and the corresponding linked information to continue to be used. Thus, for example, according to one embodiment of the invention, a payer has a separate database, payer databases 827, and matches are created between items, such as addresses or payment entities and payer 827 and respective items in global database 828 through a match generation process 830. Such matched generation process 830 may include providing a user of the payer system 801 with a series of candidate matches between addresses stored on payer database 827 and corresponding spellings of addresses or payment entities in global database 828. The user of payer system 801 is then able to select the best match and create a link between the respective address or payment identification.

This link can then later be used to effect payment to the proper address as stored in the global database. Similarly, a match generation between items in payee database 829 and global database 828 can be performed so that payee system 802 can send items to the proper recipient using information in global database 828. Enrollment logic 835 is available to enroll new entities as payees into the global database to make them available for use by payer system 801 or payee system 802.

The links established are then available to allow for use of information in the respective payer database 827 and payee database 829 in order to find recipients to whom documents or payments are to be sent. In addition to address information 838 and account information 839, according to one embodiment of the invention, public keys of various participants in the systems are stored in the global database 828. Such keys are then available for use in order to determine the accuracy of a digital signature sent by a particular entity. Additional information regarding global database 828 and related logic and communication is contained in the United States Patent Application entitled Collaborative Vendor Reconciliation, application Ser. No. 10/155,797, invented by Duc Lam, George Muller, Chandra (CP) Agrawal, Baby Lingampalli, Pavel Login and Xuan (Sunny) McRae, which is incorporated herein by reference in its entirety.

In the FIG. 8 system, invoices and other documents are exchanged between payers and payees over the public and internet networks 880. To help provide security and privacy, before they are sent, invoices and other documents are signed with source private key, and encrypted with destination public key shown as 881. Upon receiving invoice or other document, the document is decrypted with its own private key, and validated against source public key to ensure non-repudiation shown as 882.

The system also can integrate with multiple enterprise resource planning (ERP) systems shown as 862. Such ERP systems include: PeopleSoft, SAP, Oracle Financials, etc. The system will integrate with these ERP systems via native and/or standard interfaces. An example of native interface for PeopleSoft is Message Agent, etc. The interfaces include EDI gateway, etc. The system utilizes the ERP to extract documents (purchase orders, invoice status, unit of measurements, vendor list, etc.), to post documents (invoices, vendor information, status, etc.).

The foregoing description of various embodiments of the invention has been presented for purposes of illustration and description. It is not intended to limit the invention to the precise forms described.

What is claimed is:

1. A method of effecting payment comprising:
   receiving from an agent at a first system instructions to send a set of checks to a set of recipients;
   adding to the instructions a digital signature of the agent created using a private key associated with the agent, the agent being associated with a first entity;
   transmitting the instructions to a second system;
   verifying the instructions at the second system using a public key corresponding to the private key associated with the agent;
   determining whether the agent has authority to send a set of checks with a digital signature that binds the entity;
   determining whether checks among the set of checks are below a particular threshold;
   creating the set of checks electronically;
   obtaining a signature from another agent for checks among the set in response to attributes of the checks;
   adding to the checks the digital signature that binds the entity; and
   sending checks from among the set of checks to respective recipients according to the instructions.

2. The method of claim 1, including requiring additional authorization before sending at least a check among the set of checks.

3. The method of claim 1, including encrypting checks in the set of check before sending to the recipients, wherein such encrypting is performed using public keys of respective recipients.

4. The method of claim 1, including,
   encrypting the checks using a dynamically generated session key;
   encrypting the session key using public keys of respective recipients; and
   attaching the encrypted session key to the encrypted checks that are sent to respective recipients.

5. The method of claim 1, including applying fraud detection upon receipt of checks among the set.

6. The method of claim 5, such fraud detection including verifying whether information in respective checks match information stored as such checks were created.

7. The method of claim 1, including receiving an electronic endorsement of checks from respective recipients and settling payment in response to the endorsement.

8. The method of claim 1, including using a private key to generate the digital signature that binds the entity, wherein the private key comprises a private key assigned to the entity for which the recipients have access to a corresponding public key.

9. The method of claim 1, including using a private key to generate the digital signature that binds the entity, wherein the private key comprises a private key assigned to the system for which the recipients have access to a corresponding public key.

10. A payment system comprising:
    a first system associated with a first entity, the first system including,
       a resource to receive from an agent instructions to send a set of checks to a set of recipients,
       a resource to hold a private key associated with an agent, and
       a resource to add a digital signature of the agent to the instructions using the private key associated with the agent; and
    a second system operative to communicate with the first system, the second system including,
       a resource to verify the instructions using a public key corresponding to the private key associated with the agent,
       a resource to create the set of checks electronically including digital signatures created using a second private key, and
       a resource to forward checks from among the set of checks to respective recipients according to the instructions.

11. The system of claim 10, including
    a database including addresses and payment information for recipients among the recipients;

association between (a) address information available to the entity for the recipients and (b) address and payment information in the database; and a resource for forwarding the checks to the recipients according respective payment information in the database based on a selection by the entity of the address information available to the entity for the respective recipients.

12. The system of claim 10, including a resource that effects a discount in payment to at least a recipient in exchange for earlier payment by the entity after approval of an invoice from the recipient.

13. The system of claim 10, including a resource that defines an invoice based input from the entity; and a resource that receives the invoice from at least a recipient among the recipients;

wherein at least a portion of payment in the set of checks is in response to the invoice.

14. The system of claim 10, including routing checks to agents associated with the entity for approval based on human resource data received from a human resource system.

15. The system of claim 10, wherein the second private key comprises a private key assigned to the entity for which the recipients have access to a corresponding public key.

16. The system of claim 10, wherein the second private key comprises a private key assigned to the system for which the recipients have access to a corresponding public key.

17. The system of claim 10, including a resource that encrypts the checks using public keys of respective recipients.

18. The system of claim 10, including a resource that encrypts the checks using a dynamically generated session key;

encrypts the session key using public keys of respective recipients; and attaches the encrypted session key to the encrypted checks that are sent to respective recipients.

* * * * *